(12) United States Patent
Malkin et al.

(10) Patent No.: US 6,602,109 B1
(45) Date of Patent: Aug. 5, 2003

(54) GRINDING WHEEL SYSTEM

(75) Inventors: Stephen Malkin, Amherst, MA (US);
Robert Gao, Amherst, MA (US);
Changsheng Guo, South Windsor, CT (US); Biju Varghese, Worthington, OH (US); Sumukh Pathare, Waltham, MA (US)

(73) Assignee: University of Massachusetts, Boston, MA (US)

( * ) Notice: Subject to any disclaimer, the term of this patent is extended or adjusted under 35 U.S.C. 154(b) by 0 days.

(21) Appl. No.: 09/465,349

(22) Filed: Dec. 16, 1999

Related U.S. Application Data

(60) Provisional application No. 60/112,456, filed on Dec. 16, 1998.

(51) Int. Cl.[7] .............................................. B24B 49/00
(52) U.S. Cl. ................. 451/8; 451/5; 451/541
(58) Field of Search ................. 451/8, 5, 541; 125/13.01

(56) References Cited

U.S. PATENT DOCUMENTS

| | | | | |
|---|---|---|---|---|
| 5,574,646 | A | | 11/1996 | Kawasaki et al. ...... 364/431.08 |
| 5,882,244 | A | * | 3/1999 | Hiyama et al. ................ 451/7 |
| 5,904,609 | A | * | 5/1999 | Fukuroda et al. ............. 451/8 |
| 5,912,821 | A | | 6/1999 | Kobayashi ............. 364/528.15 |
| 5,944,580 | A | * | 8/1999 | Kim et al. ..................... 451/9 |
| 5,991,698 | A | * | 11/1999 | Hao et al. ..................... 451/8 |
| 6,010,538 | A | | 1/2000 | Sun et al. ..................... 451/8 |
| 6,015,754 | A | * | 1/2000 | Mase et al. ................... 451/5 |
| 6,143,123 | A | * | 11/2000 | Robinson et al. .......... 451/289 |
| 6,257,953 | B1 | * | 7/2001 | Gitis et al. .................... 451/5 |
| 6,315,635 | B1 | * | 11/2001 | Lin ................................ 451/7 |

OTHER PUBLICATIONS

Malkin et al., Semi–Annual Report#1: Development of an "Intelligent Grinding Wheel" for In–Process Monitoring of Ceramic Grinding, U.S. Department of Energy, ID No. De–FG05–96OR22524, Aug., 15, 1997, available over the Internet at www.doe.gov/bridge.

Malkin et al., Semi–Annual Report#2: Development of an "Intelligent Grinding Wheel" for In–Process Monitoring of Ceramic Grinding, U.S. Department of Energy, ID No. De–FG05–96OR22524, Jan. 17, 1998, available over the Internet at www.doe.gov/bridge.

Malkin et al., Semi–Annual Report#3: Development of an "Intelligent Grinding Wheel" for In–Process Monitoring of Ceramic Grinding, U.S. Department of Energy, ID No. De–FG05–96OR22524, May 5, 1998, available over the Internet at www.doe.gov/bridge.

Pathare et al., A DSP–Based Telemetric Data Acquisition System for In–Process Monitoring of Grinding Operation, IEEE Instrumentation and Measurement Technology Conference, St. Paul, Minnesota, May 18–21, 1998, pp. 191–195.

Matsumoto et al., Monitoring of Grinding Process with a Sensor Integrated CBN Wheel, Presented at the 5th International Grinding Conference by the Society of Manufacturing Engineers, Oct. 26–28, 1993, Cincinnati, Ohio.

* cited by examiner

*Primary Examiner*—Lee D. Wilson
(74) *Attorney, Agent, or Firm*—Fish & Richardson P.C.

(57) ABSTRACT

A grinding wheel system includes a grinding wheel with at least one embedded sensor. The system also includes an adapter disk containing electronics that process signals produced by each embedded sensor and that transmits sensor information to a data processing platform for further processing of the transmitted information.

18 Claims, 25 Drawing Sheets

GRINDING WHEEL SYSTEM

This application claims benefit of priority from U.S. Provisional Patent Application Serial No. 60/112,456, filed on Dec. 16, 1998, which is incorporated herein by reference in its entirety.

STATEMENT AS TO FEDERALLY SPONSORED RESEARCH

This invention was made with Government support under DE-FG05-96OR22524 awarded by the U.S. Department of Energy. The Government may have certain rights in the invention.

FIELD OF THE INVENTION

The invention relates to grinding wheels.

BACKGROUND

Grinding is a widely used precision machining process, accounting for over 20% of all machining processes in the manufacturing industry. Referring to FIG. 1, one type of grinding process employs a rapidly spinning grinding wheel 10 bonded with abrasive materials 12 (e.g., diamond abrasive particles in a resin, vitreous, or metallic bond). The wheel 10 grinds workpiece 14 moving slowly underneath the wheel 10.

Ceramic materials such as silicon nitride, silicon carbide, aluminum oxide, and zirconia are hard, low density materials with high wear resistance and the ability to withstand high temperatures. Grinding is often used to machine ceramic workpieces and workpieces made of other materials into their final shape. Costs associated with grinding include the cost of preparing a wheel (e.g., wheel truing and dressing).

Truing typically rounds a wheel by machining excess abrasive material off its periphery as the wheel rotates. Initially, a truing tool engages the rotating out-of-round wheel intermittently, removing material from protruding areas and progressively engaging more of the periphery as the wheel is rounded.

Dressing conditions the wheel surface topography to achieve a desirable grinding behavior. Typically, a bonded abrasive dressing stick is passed over the wheel periphery to expose the abrasive grains by eroding away binder and possibly removing and/or fracturing diamond grains. Re-dressing is periodically needed during grinding to recondition or resharpen a worn wheel surface. Severe and/or frequent dressing can result in excessive wheel consumption, whereas too gentle or insufficient dressing can result in a dull wheel. Dressing frequently can be time consuming and reduce the life of expensive abrasive materials. On the other hand, grinding with a dull wheel causes increased grinding forces which can lead to chatter vibration and damage to the workpiece.

For precision grinding operations, the wheel depth of cut may be comparable to or smaller than the wheel out-of-roundness. Therefore, wheel engagement with the workpiece can vary considerably during a single rotation. The wheel may even completely lose contact with the workpiece during part of each rotation. This unsteady behavior can have a deleterious effect on the wheel surface and the quality of the ground workpiece.

Material removal during grinding occurs when abrasive grains interact with the workpiece. This interaction generally involves both ductile flow and brittle fracture. As an abrasive grain engages the workpiece, initial cutting by ductile flow is followed by localized fracture if the grain depth of cut and the resulting force on the grain becomes sufficiently large. By analogy with indentation fracture mechanics, two principal types of cracks have been identified: lateral cracks which cause material removal and radial cracks which cause strength degradation. The implication of this observation is that strength degradation may be minimized by promoting ductile flow instead of fracture at the ground surface. For finish grinding operations, this would usually require extremely slow removal rates in order to achieve a small enough grain depth of cut and small enough force per grain. However, as a wheel is used and the abrasive material becomes duller, force levels increase, making it necessary to periodically re-dress the wheel. Periodic truing may also be necessary to restore the macroscopic shape of the wheel.

Typically, operators monitor the grinding and preparation processes to determine when the wheel is rounded and when the wheel needs to be dressed. Because of the practical difficulty in assessing the condition of a rapidly rotating wheel, operators typically manage wheel usage based on observation and experience. For example, an operator may periodically stop a grinding process to examine wheel characteristics (e.g., roundness and dullness) at intervals determined by the type of workpiece being ground.

SUMMARY OF THE INVENTION

Embedded force and acoustic emission sensors and on-wheel electronics enable an operator to continuously monitor wheel conditions using sophisticated real-time techniques without interrupting the grinding process. Processing electronics can be attached to the wheel using a modular adapter disk that enables operators to easily reuse, maintain, and modify the electronics.

In general, in one aspect, the invention features a grinding wheel system that includes a grinding wheel with at least one embedded sensor and an adapter disk containing electronics that processes signals produced by each embedded sensor. The adapter disk is constructed to attach to the grinding wheel and to connect to each sensor lead when attached. The electronics include a transmitter that transmits sensor information to a data processing platform. The data processing platform includes a processor, a receiver that receives sensor information transmitted by the electronics, and instructions that cause the processor to process the received sensor information.

Different embodiments can include one or more of the following features. The grinding wheel may include at least one force sensor which may be positioned near the grinding wheel periphery. The grinding wheel may include at least one acoustic emission sensor which may be positioned near the grinding wheel rim. The sensors may be piezoceramic sensors.

The electronics can include an analog to digital converter connected to a sensor and a digital signal processor fed by the analog to digital converter. The electronics can include a multiplexer connected to the embedded sensors.

The data processing platform instructions can compare sensor information collected from different sensors at substantially the same time and/or compare sensor information collected from a single sensor at different times. The instructions can cause the processor to process sensor information using at least one neuro-fuzzy network.

In another aspect, a grinding wheel system includes a grinding wheel with at least one piezoceramic sensor embedded near the wheel periphery for detecting wheel forces and at least three piezoceramic sensors positioned near the grinding wheel rim. An adapter disk containing electronics that processes signals produced by the sensors attaches to the grinding wheel and connects to each sensor lead. The electronics include a multiplexer fed by the sensor leads, an analog to digital converter fed by the multiplexer, a digital signal processor fed by the analog to digital converter, and a radio frequency transmitter fed by the digital signal processor. The data processing platform includes a processor, a radio frequency receiver that receives sensor information transmitted by the adapter disk electronics, and instructions that cause the processor to process the received sensor information.

In another aspect, an adapter disk that processes signals produced by at least one sensor embedded in a grinding wheel includes at least one lead for connecting to each embedded sensor and electronics for processing sensor signals.

In another aspect, a computer program, disposed on a computer readable medium, that analyzes data acquired via sensors embedded in a grinding wheel includes instructions that cause a processor to receive sensor data representing force sensed by each sensor and analyzing the received data.

The computer program may determine, for example, wheel dullness, grinding mode, roundness, and/or roughness. The computer program can implement at least one neuro-fuzzy network.

The invention provides several advantages. The grinding wheel system permits sophisticated real-time analysis of grinding wheel conditions. The positioning of the force and acoustic emission sensors prevents the sensors from producing responses to normal wheel events (e.g., vibrations routinely produced during grinding). By housing electronics in an adapter disk, operators can easily reuse, maintain, and modify the electronics. The system's data processing capabilities provide a wide variety of information regarding wheel characteristics.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages-of the invention will be apparent from the following detailed description, and from the claims.

DETAILED DESCRIPTION

Figure 1:
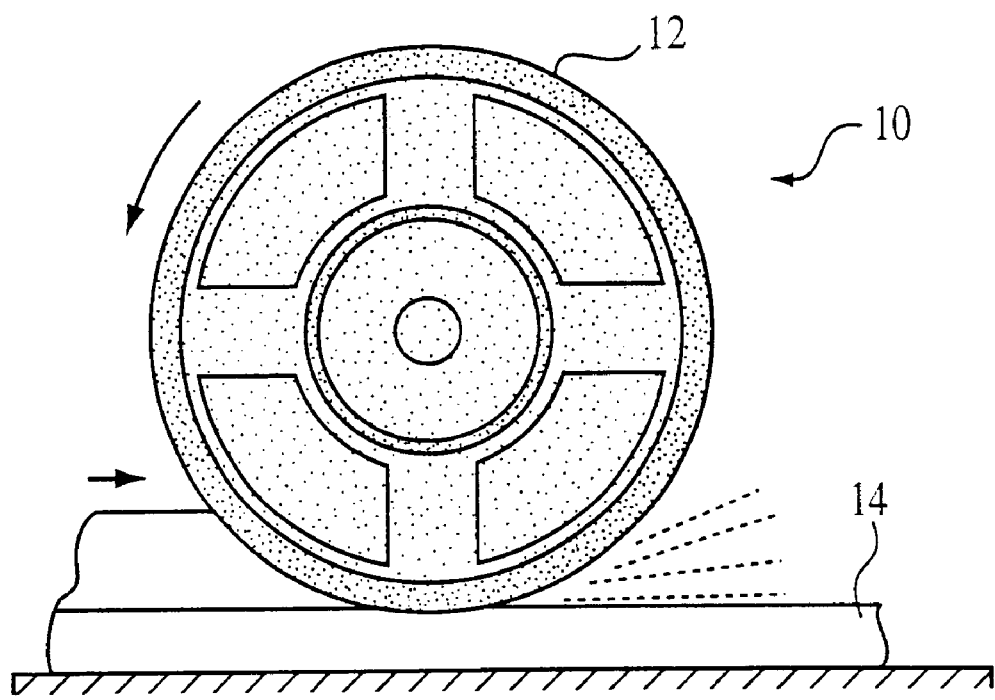
FIG. 1 is a diagram of a grinding wheel.
Figure 2:
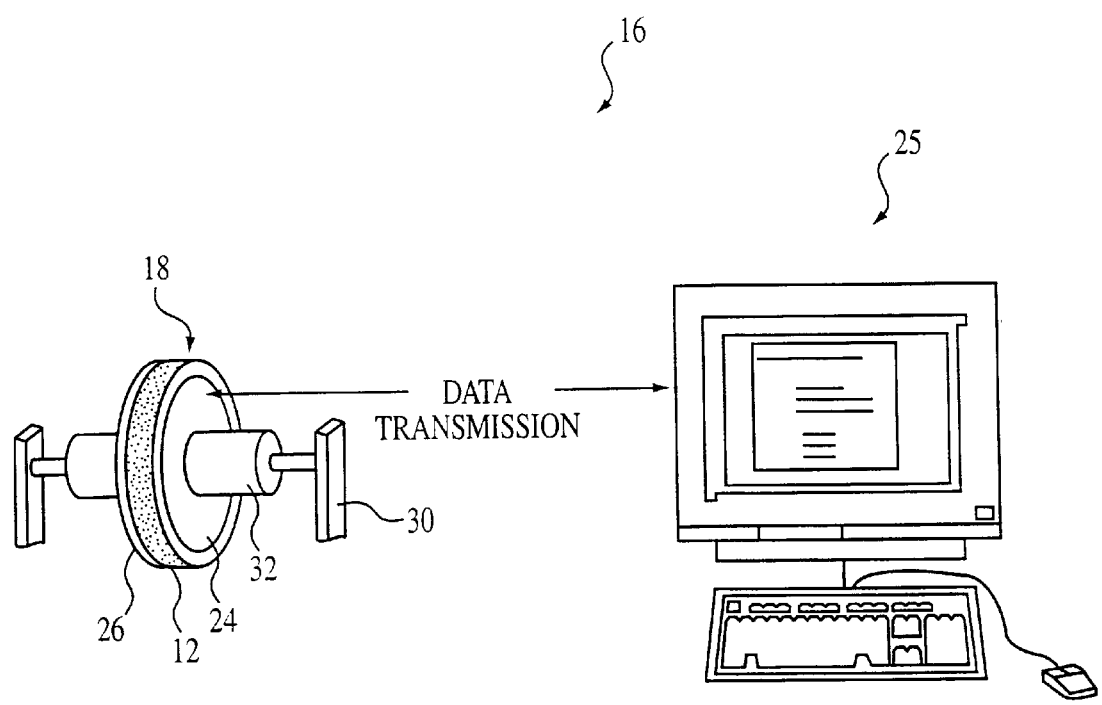
FIG. 2 is a diagram of a grinding wheel system.

Referring to FIG. 2, a grinding wheel system 16 includes a grinding wheel core 18 (e.g., a reusable aluminum core) coated by an abrasive material 12. The wheel core 18 includes embedded sensors (see e.g., FIG. 3) such as force and/or acoustic emission (AE) sensors. A removable adapter disk 24 attached to the wheel core 18 houses electronics that process sensor signals and transmit (e.g., via wireless transmission) the processed signals to the data processing platform 25 for analysis. A removable dummy disk 26 balances the weight of adapter disk 24. As shown, shaft 32 supported by fork 30 rotates grinding wheel 18. Rotation of wheel 18 may be electronically controlled by adapter disk 24 or data processing platform 25. Other systems of shafts and forks can be used.

Aspects of this system are described in S. Pathare, R. Gao, B. Varghese, C. Guo, and S. Malkin, "A DSP-Based Telemetric Data Acquisition System for In-Process Monitoring of Grinding Operation," I.E.E.E. Instrumentation and Measurement Technology Conference, May 1998; S. Malkin, R. Gao, C. Guo, B. Varghese, and S. Pathare, "Development of an Intelligent Grinding Wheel for In-Process Monitoring of Ceramic Grinding", Semi-Annual Report #1, May 1997, available on-line by searching for doe.gov/bridge.

Sensor Construction and Placement

Figure 3:
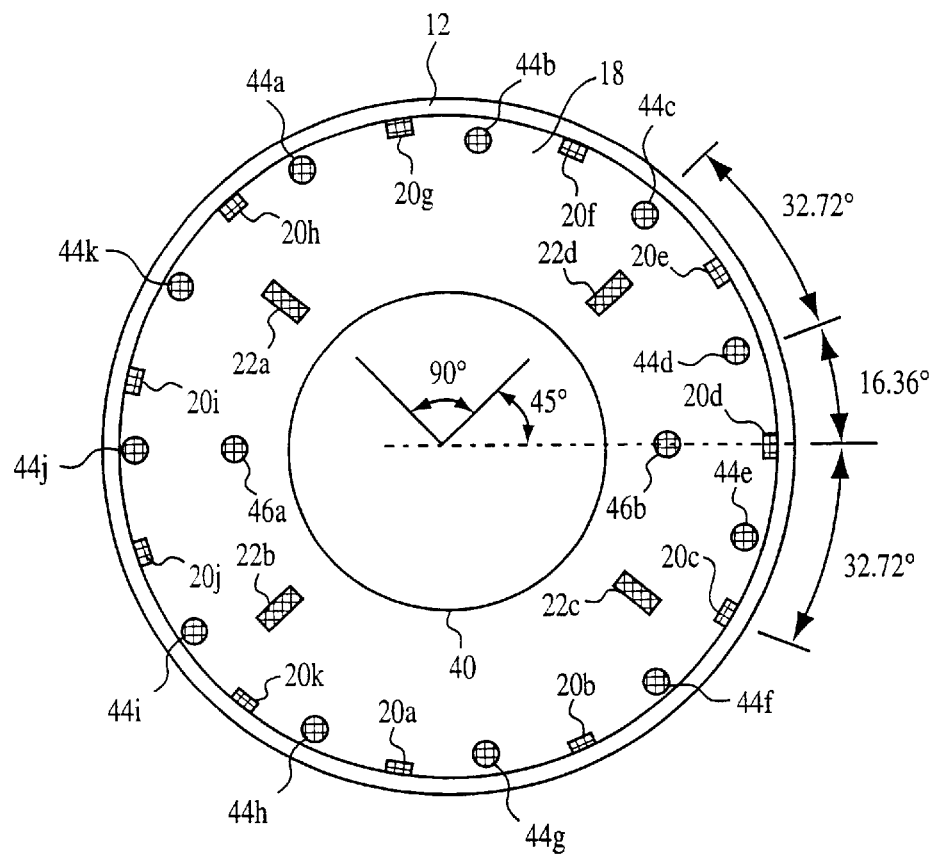
FIG. 3 is a diagram of sensor placement on a grinding wheel.

Referring to FIG. 3, the wheel core 18 includes sensors such as force detection sensors 20a-20k (force sensors) and acoustic emission (AE) sensors 22a-22d. As shown, the core 18 includes eleven force sensors 20a-20k and four AE sensors 22a–22d symmetrically positioned about the core 18. As shown, the wheel core 18 also includes bolt 44a–44k and dowel pin 46a–46b openings to permit the adapter disk 24 and the dummy disk 26 to sandwich the wheel core 18.

A core 18 may have different numbers of force and AE sensors than the number shown. Additionally, the sensors need not have a symmetrical configuration, although a symmetrical configuration offers certain advantages discussed below. The use of both force 20a–20k and AE sensors 22a–22d permit data processing platform 25 to monitor a wide variety of wheel characteristics.

Figure 4:
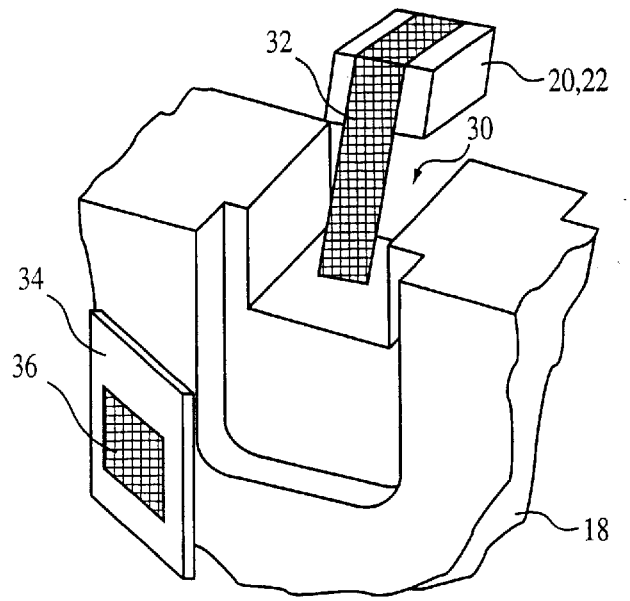
FIG. 4 is a diagram of a sensor.

Referring to FIG. 4, glue can be used to hold each sensor (e.g., force sensor 20) in a pre-machined slot in the core 18. A sensor 20 terminal connects to metal foil 32 which may be mounted flush against the core 18 surface. An insulating seal 34 provides a conductive strip 36 that electrically transmits a charge developed on sensor 20 in response to forces or acoustic emissions to adapter disk 24 electronics. A wide variety of other methods of embedding or affixing sensors can be used. Other sensors such as strain gages and/or magnetoelastic sensors can also be used.

Although a wide variety of sensors can be used, sensors that respond to the piezoelectric effect (e.g., sensors having piezoceramic chips) respond to both wheel forces and acoustic emissions. Sensor responses in the MHz range correspond to acoustic emissions. Responses in the ten to hundred kHz range represent dynamic forces. By using electronic filters, a sensor's response can be easily divided into force and acoustic emission components.

Figure 5:
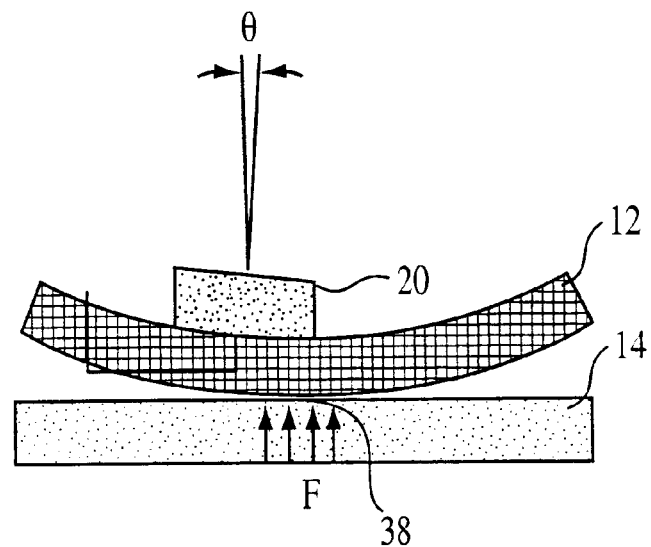
FIG. 5 is a diagram of a force sensor.
Figure 6:
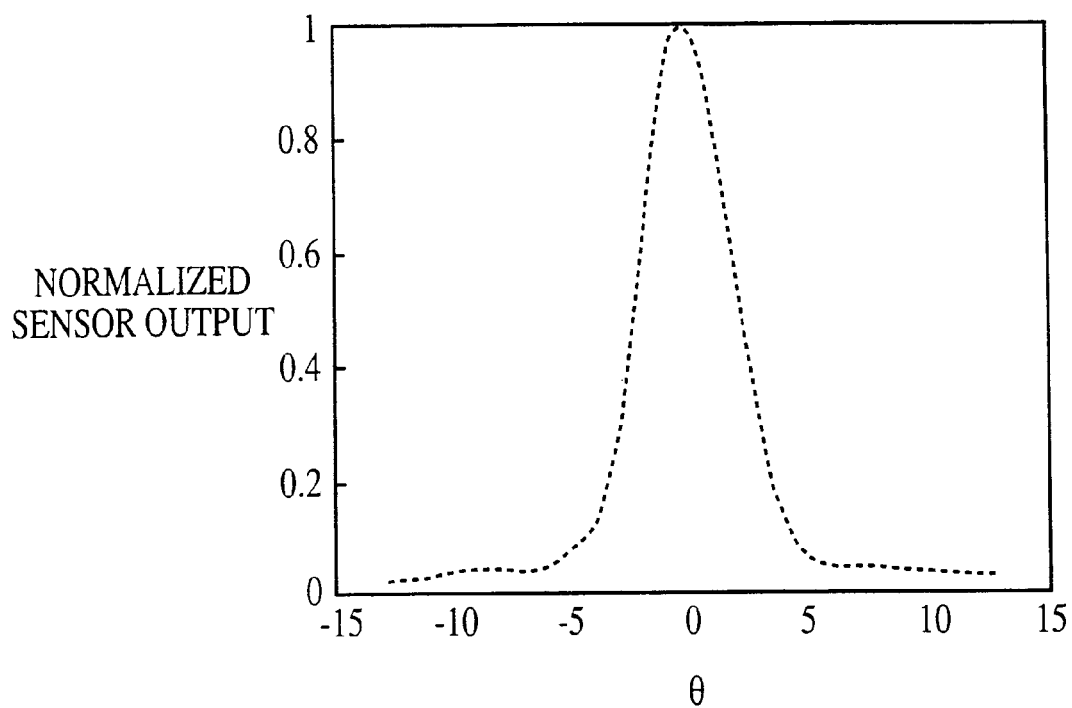
FIG. 6 is a graph of force sensor response.
Figure 7A:
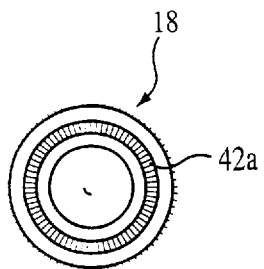
FIGS. 7A-7D are diagrams of vibrational patterns routinely experienced by a wheel.
Figure 7B:
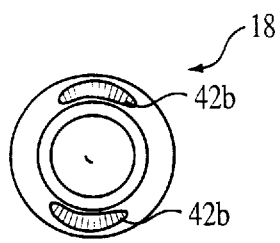
Figure 7C:
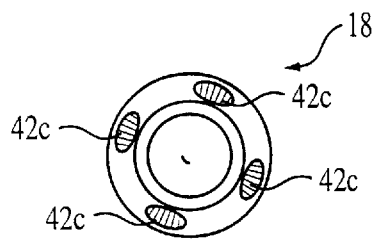
Figure 7D:
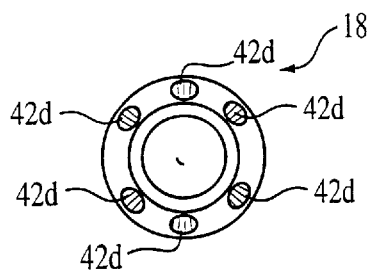

Referring to FIG. 5, a force sensor 20 produces a charge proportional to the impulsive stress waves generated when abrasive 12 grains interact with the workpiece 14. Referring also to FIG. 6, sensor response 20 rapidly diminishes as the sensor rotates away from the point 38 where the abrasive 12 and workpiece 14 meet. That is, the amplitude of the force signal measured depends on the angle θ formed between a vertical line at the point 38 the abrasive material 12 and the workpiece 14 meet and a normal line determined by the outer curvature of the core 18 where the sensor 20 resides.

Referring again to FIG. 3, the wheel core 18 includes eleven force sensors 20a–20k symmetrically positioned around the wheel periphery to detect surface forces. As described below, the number and position of the sensors can be determined based on different factors. The proximity of these peripheral force sensors 20a–20k to the grinding surface increases their sensitivity to forces produced by the interaction between the wheel 18 and workpiece 14.

The number of force sensors 20a–20k included in a wheel core 18 depends on a variety of factors such as wheel dimensions, rotational speed, the configuration of the abrasive material, sensor dimensions, the complexity of data processing electronics, and space restrictions. For example, abrasive materials 12 can be glued to the wheel core 18 in twenty-two adjoining sections. The number of force sensors 20a–20k may be a multiple or fraction of the sections to maintain symmetrical sensor arrangement and avoid discontinuity between sections.

The position of force sensors 20a–20k depends on sensitivity requirements, sensor overload protection, and angular coverage. For increased sensitivity, the force sensors 20a–20k are sandwiched between the wheel core 18 and the abrasive material 12. Due to the high rigidity of the wheel core 18, the orientation of a force sensor 20a–20k with respect to the wheel periphery does not have any measurable effect on the sensor's 20a–20k angular range of coverage. To protect the force sensors 20a–20k, a two-component epoxy (e.g., Araldite AV1258 with hardener HV1258) can be used to attach the abrasive material 12 to the core 34.

As shown in FIG. 3, the wheel core 18 includes AE sensors 22a–22d positioned near the wheel inner rim 40. Acoustic emission sensors 22a–22d can be used to triangulate acoustic emissions produced by structural imperfections (e.g., microscopic cracks) in a wheel core 18. Triangulation requires a minimum of three AE sensors, e.g., 22a–22c, to pinpoint a source of an acoustic emission. As shown, the core 18 includes a fourth AE sensor 22d for redundancy and increased measurement accuracy.

Referring to FIGS. 7A–7D, locating AE sensors 22a–22d near the wheel rim 40 minimizes noise caused by the normal vibrational behavior of the wheel core 18. FIGS. 7A–7D, show four modes (i.e., harmonic vibration response) of a wheel core 18 in normal operation. The modes produce acoustic pressure maxima and minima 42a–42d near the center of the wheel core 18 annular region. These shapes 42a–42d represent areas where AE sensors 22a–22d function poorly. Thus, AE sensors 22a–22d are located near the wheel rim 40 as shown in FIG. 3.

Wheel Electronics

Figure 8:
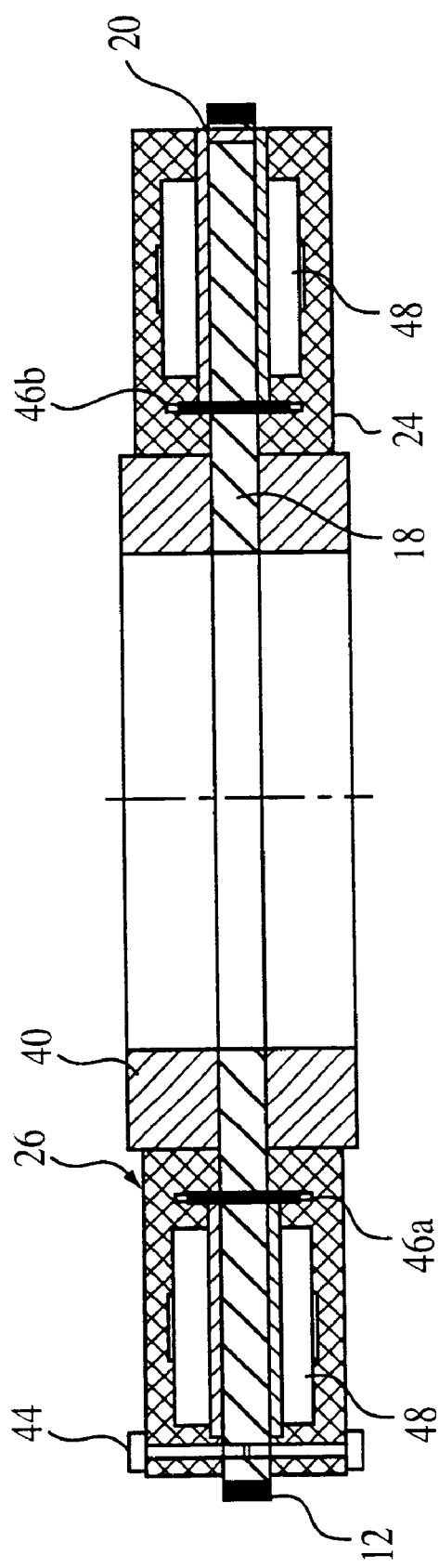
FIG. 8 is a diagram of an adapter disk and a dummy disk attached to a wheel.

Referring to FIG. 8, a removable adapter disk 24 and removable dummy disk 26 fit around the wheel core's inner rim 40. Bolts (e.g., bolt 44) and dowel pins 46a–46b secure adapter disk 24 and dummy disk 26 to the wheel core 18. The adapter disk 24 holds electronics (e.g., transmitter, power supply, and a Digital Signal Processor (DSP)) that process sensor 20a–20k, 22a–22d information in a disk cavity 48. The dummy disk 26 offers an identical mass distribution as the adapter disk 24 to maintain wheel symmetry and balance. The adapter disk 24 enables sensor signal processing to occur at the wheel core 18 with minimal structural modification of the wheel core 18. The adapter disk 24 also facilitates easy access and maintenance of the electronics. That is, an operator can modify and/or update the electronics to measure other wheel-related parameters without dismounting the wheel 18. Additionally, during maintenance or modification of the electronics, an operator can continue to use the wheel core 18 for conventional grinding. The modular design also offers operators the flexibility of using the same measurement electronics for a variety of wheels using different abrasives or having different thickness and/or widths.

Figure 9:
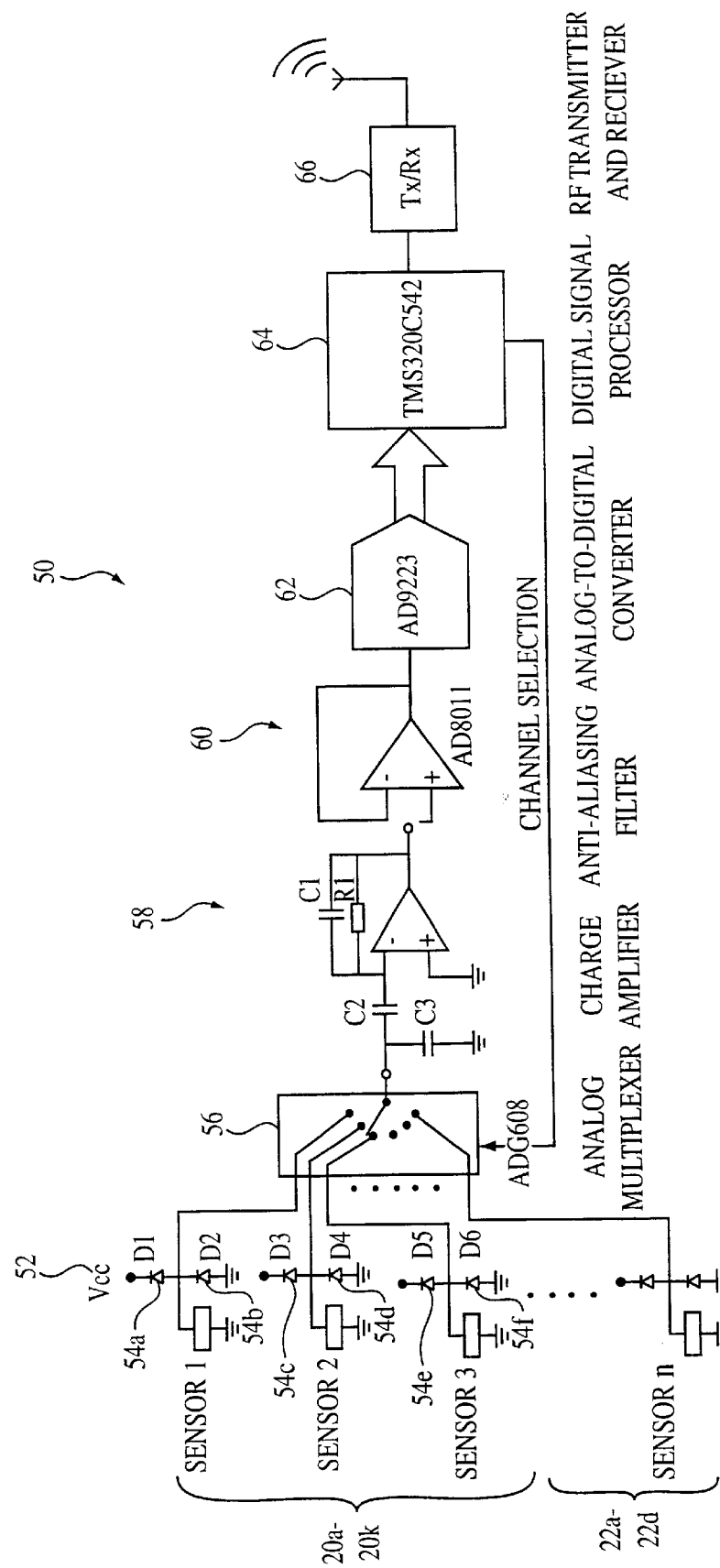
FIG. 9 is a diagram of adapter disk electronics.

Referring to FIG. 9, electronics 50 process signals (e.g. electrical charges) produced by the force 20a–20n and AE sensors 22a–22n. The electronics 50 can be embedded in the wheel core 18 or housed in adapter disk 24. As shown, the electronics 50 include an analog multiplexer 56 that selects between different sensors 20a–20k, 22a–22d, a charge amplifier 58 that transforms a sensor charge into a voltage, an anti-aliasing filter 60, an analog-to-digital (A/D) converter 62, a DSP 64 that performs filtering and other data processing tasks, and a transmitter/receiver 62. Other implementations use different architectures. For example, a very basic implementation does not use a DSP 64 at all, but instead directly transmits the analog signal of each sensor 20a–20k, 22a–22d to the data processing platform 25. Such a system can place a heavy burden on the data processing platform 25 by transmitting such a large volume of information. The use of a DSP 64, as shown, permits real-time signal processing at the wheel in addition to selective transmission of gathered information.

The electronics' 50 architecture shown offers an efficient system powered by a compact, lightweight J size 6-V battery 52. Diode protective circuitry 54a–54f connected to the input of each multiplexer 56 prevent damage due to high voltages from the piezoceramic sensors. The diodes 54a–54f offer high speeds and low reverse leakage currents. In addition, their low parasitic capacitance helps preserve signal quality.

Sensor input signals feed an analog multiplexer 56 (e.g., an ADG608). Channel selection is achieved by using a data latch configured as an output port of the DSP 64. The multiplexer 56 shown requires a supply current of 0.1 uA with a channel switching time of 100 ns.

Multiplexing the sensor signals makes it possible to use a single charge amplifier 58, anti-aliasing filter 60, and A/D converter 62 to process the force 20a–20n and AE sensors 22a–22n. The use of a single set of electronic components minimizes the influence of component variations (e.g., amplifier gain) on signals.

Charge amplifier 58 converts a sensor's electrical charge to a voltage signal proportional to either the amplitude of the applied forces or the acoustic emission. A high-speed operational amplifier (e.g., an AD-822) is configured as a charge amplifier 58. The lower cut-off frequency ($f_L$) of the charge amplifier 58 is set to 25 Hz by proper choice of the feed-back resistor (R1) and capacitor (C1), as given by:

$$f_L = 1/(2\pi R_1 C_1) \qquad [1]$$

Considering a time constant of the charge amplifier that is ten times as long, the lowest wheel rotational speed required for distortion-free force measurement is approximately 50 revolutions per minute (RPM). This number is much lower than that typically required for wheel preparation and/or grinding. Therefore, the charge amplifier 58 can accurately measure force and AE signals at the low frequency end.

The charge amplifier 58 also needs to respond fast enough to capture sensor signals. For this purpose, the highest frequency component of force signals is calculated by considering that as the point of contact 38 sweeps past a force sensor, a force impulse (T) is generated whose duration is related to the peripheral wheel velocity $v_s$ by:

$$T = w/v_s \qquad [2]$$

where w is the width of the sensor and $v_s$ is the velocity of the wheel perimeter. Thus, a wheel velocity of 60 m/s and sensor width of 3 mm, T=50 us. This corresponds to a signal frequency of about 20 kHz. Because AE signals are typically an order of magnitude higher, the highest signal frequency that needs to be processed by the charge amplifier is expected to be 500 kHz. The AD-822's bandwidth of 1.8 MHz can easily handle this range of frequencies. For input signal attenuation, the charge amplifier 58 is preceded by a capacitive charge attenuator. The transfer function of the charge attenuator—charge amplifier block is given by:

$$V(s) = Q(s) \cdot \frac{A(s)}{[A(s)+1]} \cdot \frac{sR_1}{[sR_1C_1+1]} \cdot \frac{C_2}{[C_2+C_3]} \qquad (3)$$

The charge amplifier 58 is followed by a four-pole anti-aliasing filter 60. The anti-aliasing filter 60 is designed using a high-precision, high band-width (300 MHz), current feed-back amplifier AD-8011 60 having a cut-off frequency of 1 MHz. Compared to voltage feedback amplifiers, current feedback amplifiers do not suffer from speed limitations due to stray capacitance and internal transistor cut-off frequencies, and, hence, are inherently faster and cover a larger bandwidth.

The anti-aliasing filter 60 feeds an A/D converter 62. The A/D converter 62 (e.g., AD-9223) has a resolution of 12 bits and can make three millions samples per second. The sampling rate was chosen to meet the Nyquist criterion for sampling signals with a bandwidth of 1 MHz. The A/D converter 62 has an on-chip voltage reference and separate power supply pins for the analog and digital sections. The analog and digital power supplies are decoupled using high value capacitors mounted near the supply input pins (not shown). A tri-state buffer and latch buffer the digitized output of the A/D converter 62. A separate clock chip clocks the A/D converter 62 and communicates with the DSP 64 in interrupt mode. A flat ribbon connector (FRC) connects the output of the A/D 62 to the DSP 64.

The DSP 64 analyzes the digitized sensor signals to remove noise and identify force and acoustic emission information. The DSP 64 analyzes the spectral characteristics of the signals in addition to their time domain behavior by performing wavelet analysis of the signals. Wavelet analysis preserves both the frequency and time domain information of a signal and allows simultaneous extraction of high and low frequency signals with different frequency resolutions. A conventional FFT (Fast Fourier Transformation) may also be used to analyze a signal.

As shown, the DSP 64 may be a TMS320C52, manufactured by Texas Instruments. The algorithms that implement wavelet analysis and other transforms are often computationally demanding. The RISC-based architecture (Reduced Instruction Set Computer) of a DSP 64 enables efficient computation of large amount of data for the multiple sensors. The DSP 64 shown includes multiple internal data buses and DARAM (dual access RAM) which enables simultaneous addition and multiplication operations. The DSP 64 shown is a sixteen-bit, fixed-point digital signal processor offering a low supply voltage requirement (3 V), multiple on-chip serial ports (3 ports), high speed calculation capability (100 MIPs), and a small package size compared to other floating-point DSPs. The DSP 64 also offers a large amount of on-chip RAM (32 kBytes), eliminating the need for external RAM and reducing the amount of space used by the electronics. Other implementations may use a microcontroller or microprocessor to perform the functions of DSP 64.

A transmitter/receiver 66 handles data transmission between the DSP 64 and the data processing platform 25. As shown, the transmitter/receiver 66 is an RF transmitter. RF transmission may be carried out in the 900 MHz FCC license-free ISM (Industrial, Scientific and Medical) band. In one implementation, the RF transmitter 66 is a single-chip hybrid IC that uses amplitude modulation in an on-off keying mode and is capable of operating at 3V. The antenna of the RF transmitter can be mounted flush on the outer surface of the adapter disk 24.

The data can be compressed and can be transmitted in digital or analog form. Compression can be configured to keep dominant frequencies while suppressing lesser ones. Digital transmission makes efficient use of the bandwidth, since the RF bandwidth for signal transmission has little relation with that of the base band. Additionally, error correction mechanisms of digital transmission permit optimum utilization of transmission power, making low power transmission possible. Further, digital transmission allows for easy time multiplexing to accommodate input signals from multiple sensors. Digital transmission also makes it possible to use multiple transmitters and receivers within the same frequency band by means of TDMA (Time Division Multiple Access) without introducing much complexity in the transmitter/receiver hardware.

Figure 10:
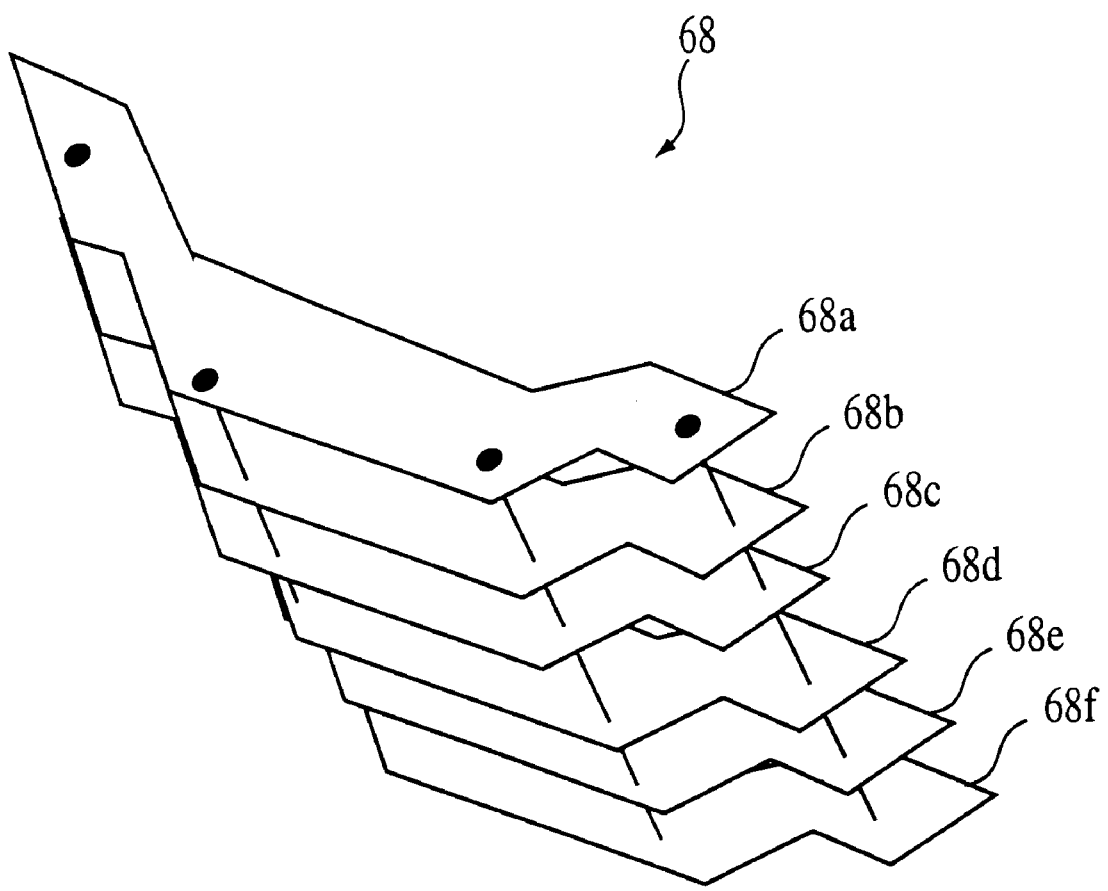
FIG. 10 is a diagram of printed circuit board layers used to provide the adapter disk electronics.

The electronics 50 are fitted (of FIG. 9) into an adapter disk 24 or into the wheel core 18 using a multilayer design to reduce system noise and save space. As shown, in FIG. 10 a six-layered PCB board (Printed Circuit Board) 68 holds electronics 50 in a shape constructed to fit within adapter disk 24. Four layers (e.g., 68b–68e) are used as signal processing layers and two layers hold power supply rails for Vcc and Ground (e.g., 68a, 68f). Separating the processing layers 68b–68e from the power supply layers 68a, 68f significantly reduces the length of connection tracks between individual layers. The two dedicated power supply layers 68a, 68f also provide a ripple-free voltage supply to the circuitry. The design reduces cross-talk and other electronic interference. Appendix A includes detailed schematics of one possible implementation. A wide variety of other techniques may be used to shield the electronics from interference and noise (e.g., foil shielding).

Figure 11:
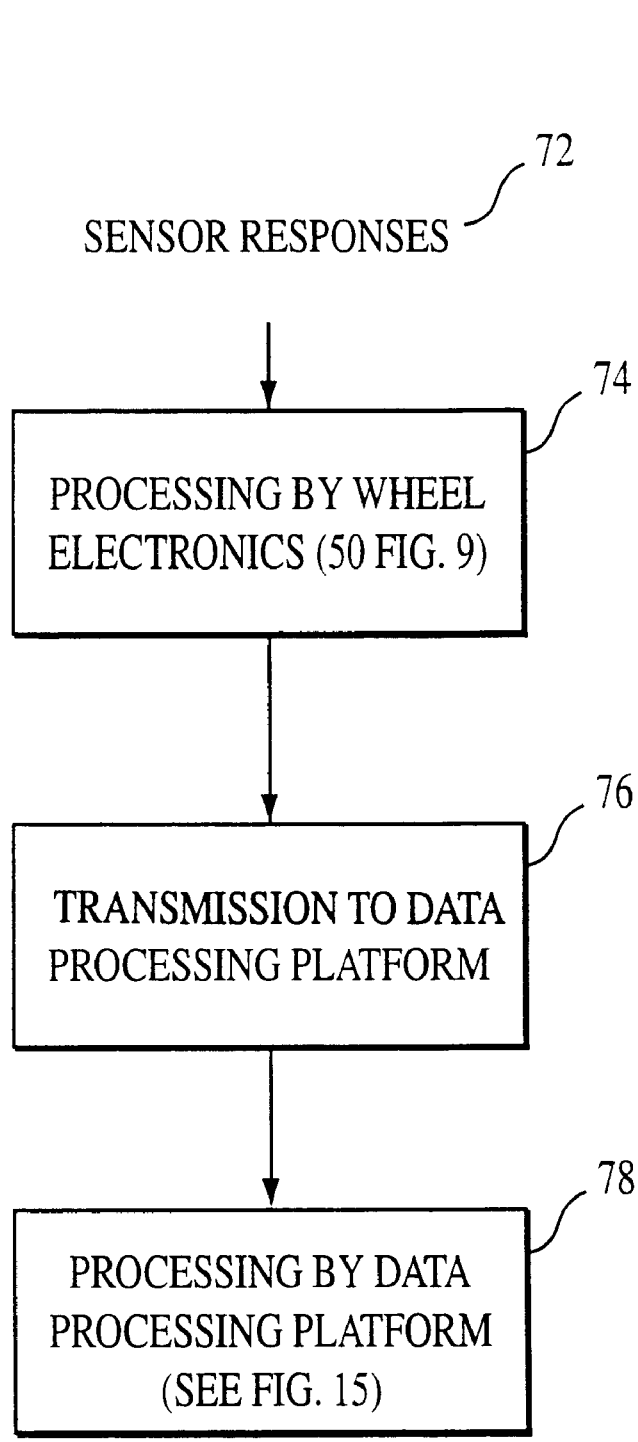
FIG. 11 is a flow-chart of processing performed by the adapter disk electronics and a data processing platform.

Referring to FIG. 11, sensor responses 72 are processed by wheel electronics (e.g., electronics 50 in adapter disk 24) (step 74) before transmission (step 76) to the data processing platform for further processing (step 78). Although in this description computational processes are performed by the wheel electronics 50 (step 74) or by the data processing platform 25 (step 78), other implementations can be used to distribute data processing functions differently.

Figure 12:
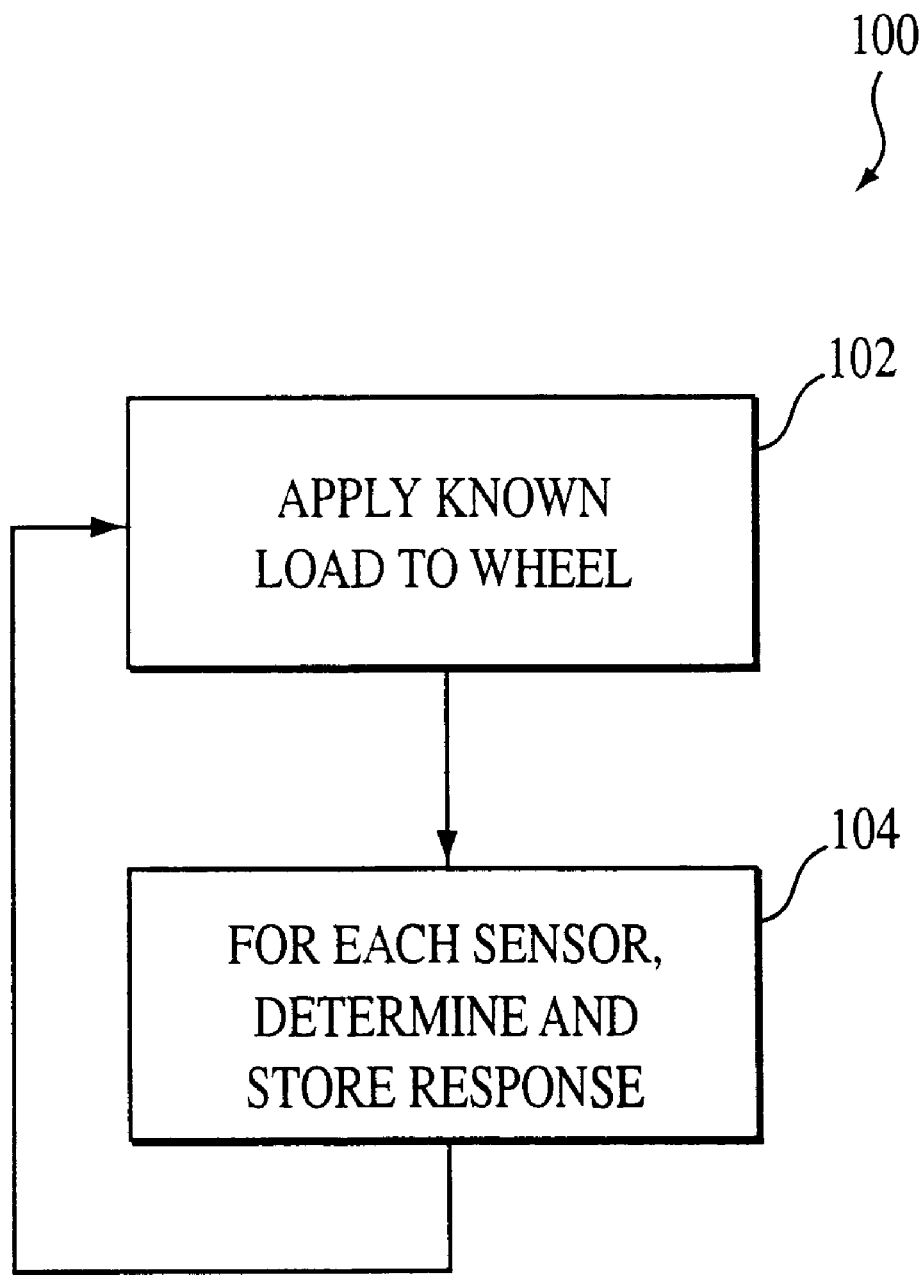
FIG. 12 is a flow-chart of a sensor calibration process.

For example, referring to FIG. 12, due to potential variations in construction, different sensors may produce different responses to the same force. For example, a first force sensor may report a different peak charge in response to a 100 lb. load than a second force sensor bearing the same load. A calibration process 100 calibrates the different sensors to prevent differences from distorting subsequent analyses. This calibration process can be performed either by the electronics 50 in adapter disk 24 or by the data processing platform 25. Calibration may include applying a known load (e.g., 100 lbs) to a wheel (step 102) and determining and storing the response of each sensor to the load (step 104). Such calibration can be repeated using different loads to determine a characteristic response curve. Thereafter, each sensor signal processed can be normalized based on the stored calibration data.

Figure 13:
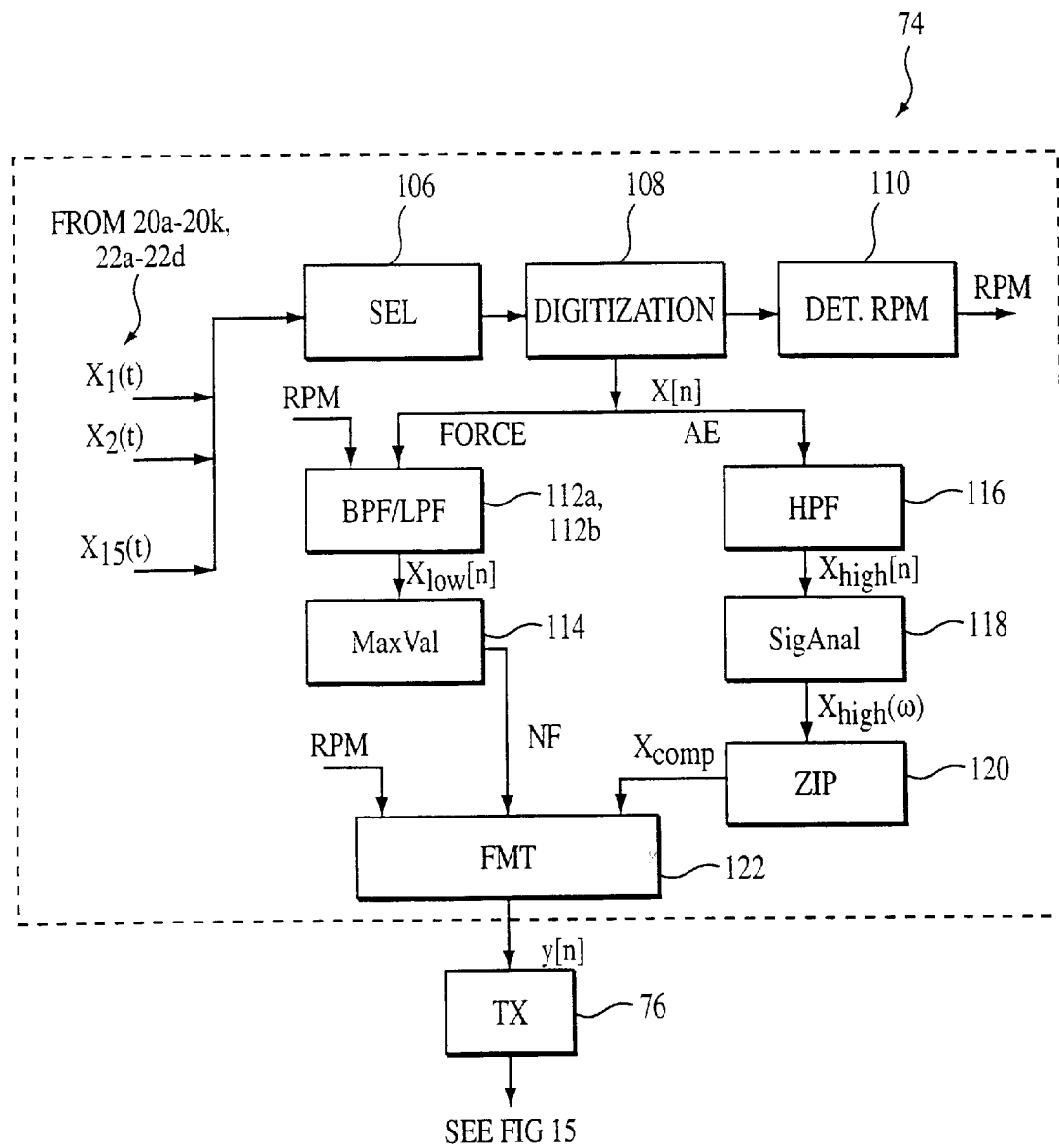
FIG. 13 is a flow-chart of adapter disk electronics data processing.

Referring to FIG. 13, as shown, the electronics 50 process 74 signals ($x_1(t)$, $x_2(t)$, $x_3(t)$) from sensors 20a–20k and 22a–22d prior to transmission to the data processing platform 25 (step 76). The DSP 64 first selects a channel (i.e., a sensor) to process (step 106). A signal (e.g, a charge) of the selected sensor is digitized (step 108) (e.g., by the charge amplifier 58 and A/D converter 62) prior to DSP 64 analysis.

The DSP 64 continually determines the wheel's rotational speed (step 110). This value is needed in subsequent computations to accurately determine the force represented by a sensor signal. One method of determining wheel speed uses a low-pass filter to measure the duration between peak sensor pulses. This duration corresponds to the time it takes a sensor to make one full rotation about the wheel. Another method analyzes a signal in the frequency domain to find the most dominant frequency which corresponds to the RPM. Both methods can be used together to double-check RPM calculations.

Figure 14:
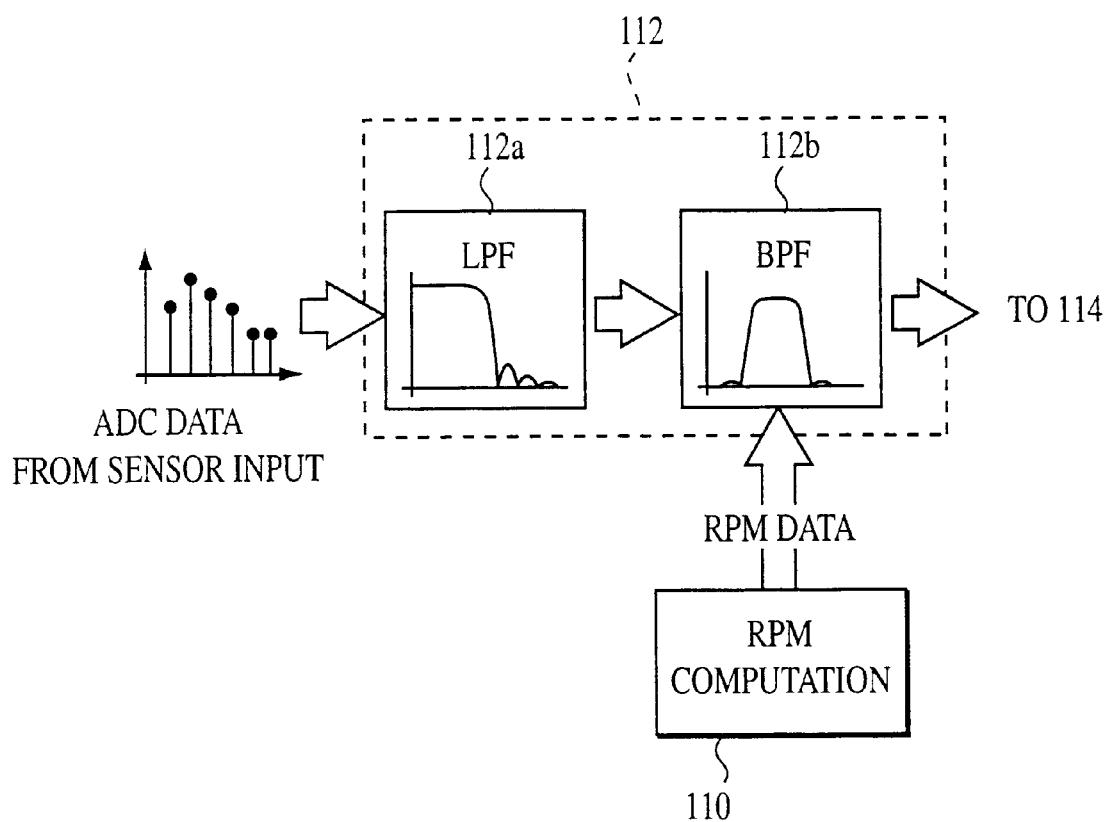
FIG. 14 is a flow-chart of a process for determining a normal force based on a sensor response.

As shown in FIG. 13, the wheel's rotational speed (i.e., RPM) is used to determine the signal amplitude produced by a force sensor (steps 112a, 112b, 114) ($x_{low}[n]$). Referring also to FIG. 14, once the RPM is known (step 110), the signal from the force sensor of interest is recorded over a predefined period of time (e.g., a few seconds). The signal is then windowed such that only the portion which occurs when the sensor passes over the contact point 38 is kept. The windowed signal is then band-limited to 30 kHz (step 112a) and passed through a bandpass filter (step 112b). The bandpass filter used for this purpose is tuned by the wheel RPM data (e.g., the filter's output is made proportional to the measured force amplitude). Calculation errors are reduced by averaging the force value for the number of rotations of the wheel. The maximum measured force value is determined (step 114). The normal force for the each force sensor is obtained (nf[i]) and a normal force vector (nf) is formed and included in a formatted transmission message (step 122) along with the measured RPM value.

The DSP 64 processes AE sensor signals using a high-pass filter (step 116) to identify the high-frequency AE components. The DSP 64 may then use wavelet analysis, FFT, or other transforms to determine the frequency-domain response of a sensor (step 118) ($X_{high}[n]$). The DSP 64 compresses (e.g., zips) the sensor data (step 120) ($X_{comp}$) for inclusion in the formatted transmission message (step 122).

The Data Processing Platform

Figure 15:
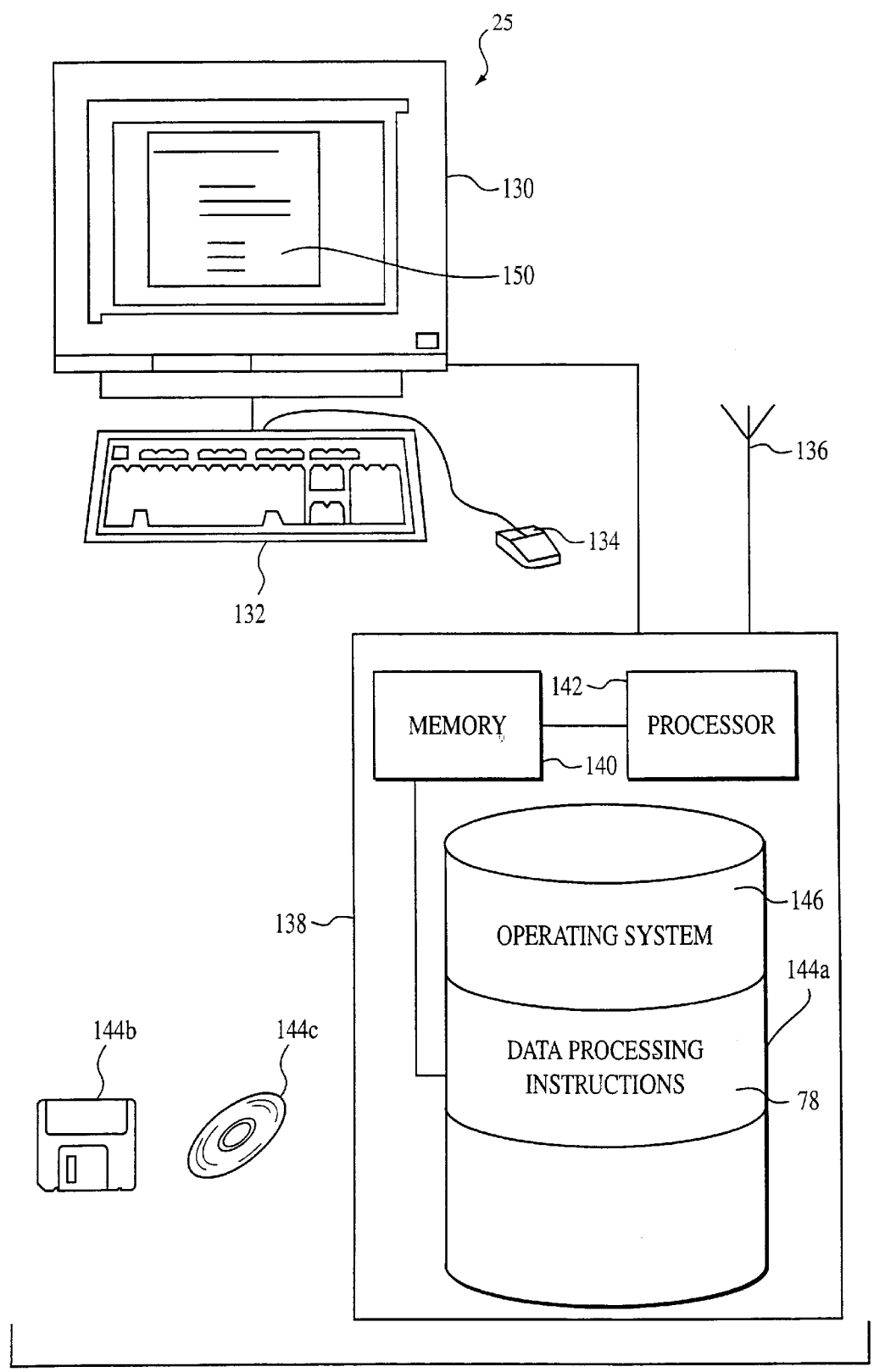
FIG. 15 is a diagram of a data processing platform.

Referring to FIG. 15, a data processing platform 25 (e.g., a standard PC or PC-compatible computer) includes a display 130, a keyboard 132, a pointing device 134 such as a mouse, and a digital computer 138. The digital computer 138 includes memory 140, a processor 142, a mass storage device 144a, and other customary components such as a memory bus and peripheral bus (not shown). The platform 25 further includes a transmitter/receiver 136. The transmitter/receiver 136 may be a single-chip hybrid RF device interfaced to the serial port of the platform 25.

Figure 26A:
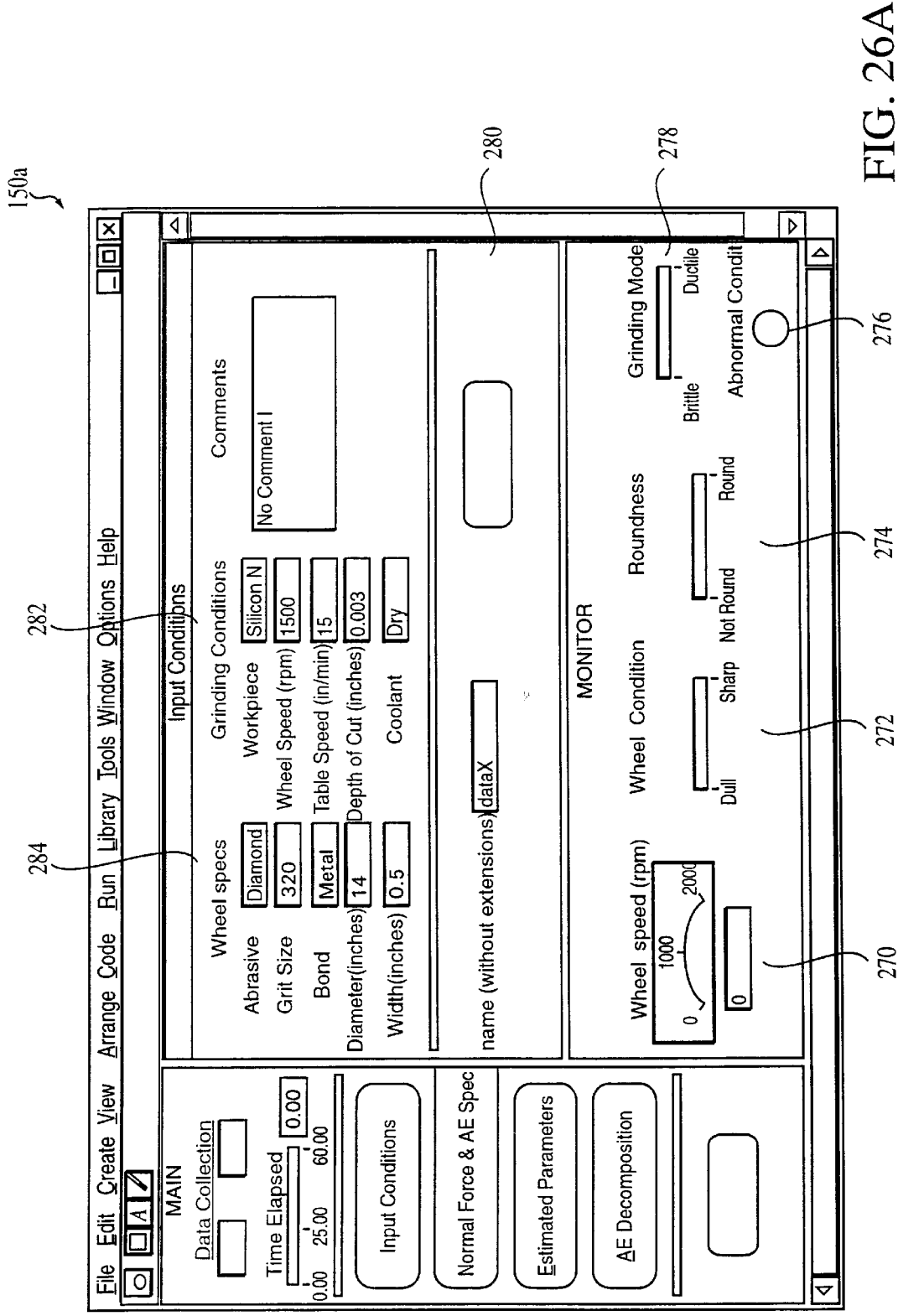
FIGS. 26A-26C are screenshots of a graphical user interface used to display wheel characteristics.
Figure 26B:
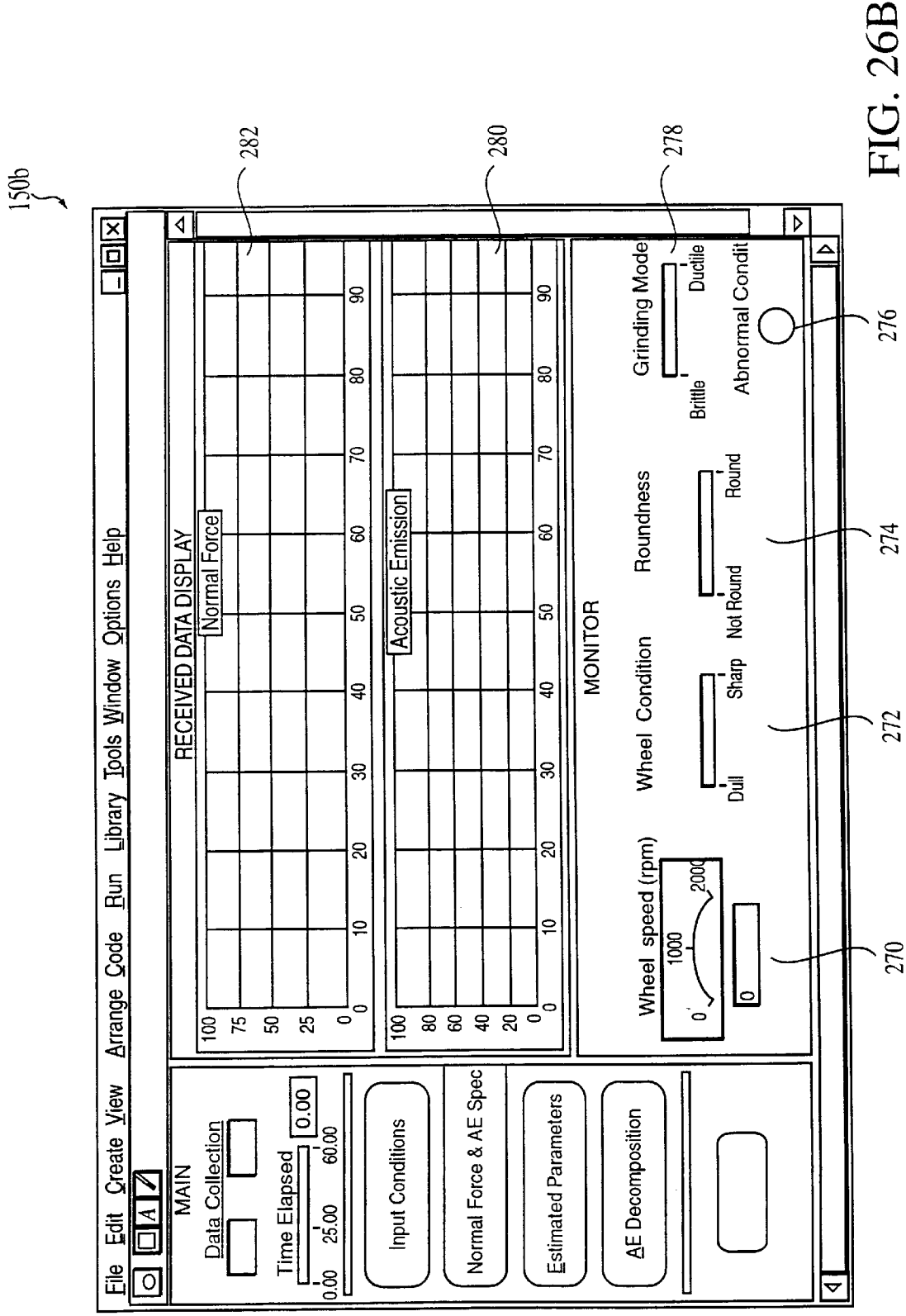
Figure 26C:
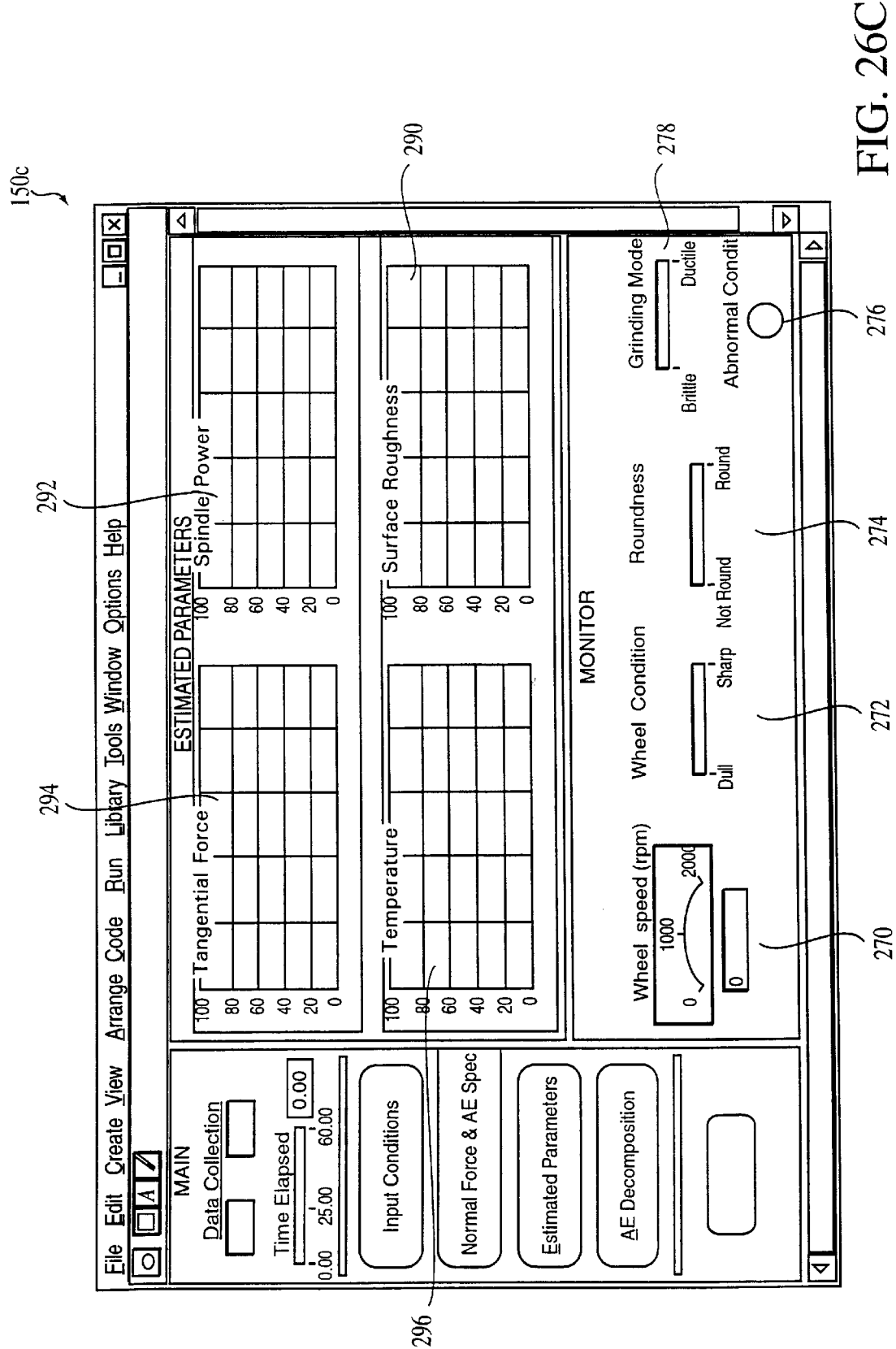

Mass storage device 144a can include operating system (e.g., Microsoft Windows 95™) instructions 146 and data processing instructions 78. Data processing instructions 78 can be transferred to memory 140 and processor 142 in the course of operation. The data processing instructions 78 can cause the display 130 and input devices 132 and 134 to provide a user interface such as a graphical user interface 150 (FIGS. 26A–26C). Data processing instructions 78 can be stored on a variety of mass storage devices such as a floppy disk 144b, CD-ROM 144c, or PROM (not shown).

Figure 16:
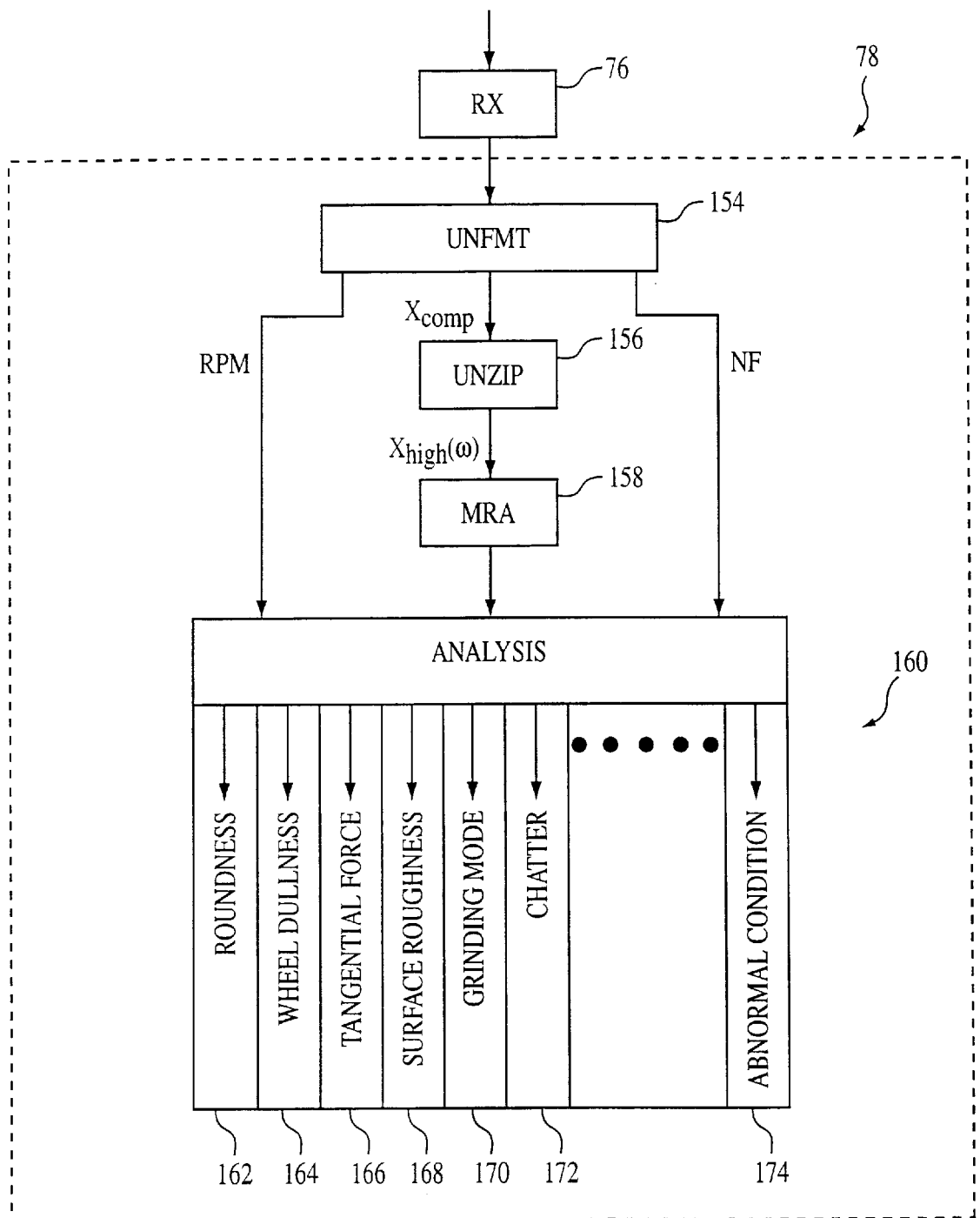
FIG. 16 is a flowchart of data processing performed by the data processing platform.

Referring to FIG. 16, after receiving data (step 76), the instructions 78 unformat (step 154) and decompress (step 156) (e.g., unzip) a received message into its components (e.g., RPM, normal force vector nf, and frequency information $X_{comp}$). Multi-resolution analysis (step 158) studies the signal at different frequency and time resolutions to recognize distinct patterns in the input signal. The data processing instructions 78 may use the data to monitor a variety of grinding phenomenon (step 160), such as roundness (step 162), wheel dullness (step 164), grinding mode (step 170), and/or chatter (step 172). Instructions 160 may also produce estimations of tangential force (step 166), surface roughness (step 168), and/or other grinding parameters (step 174) such as temperature.

Figure 17:
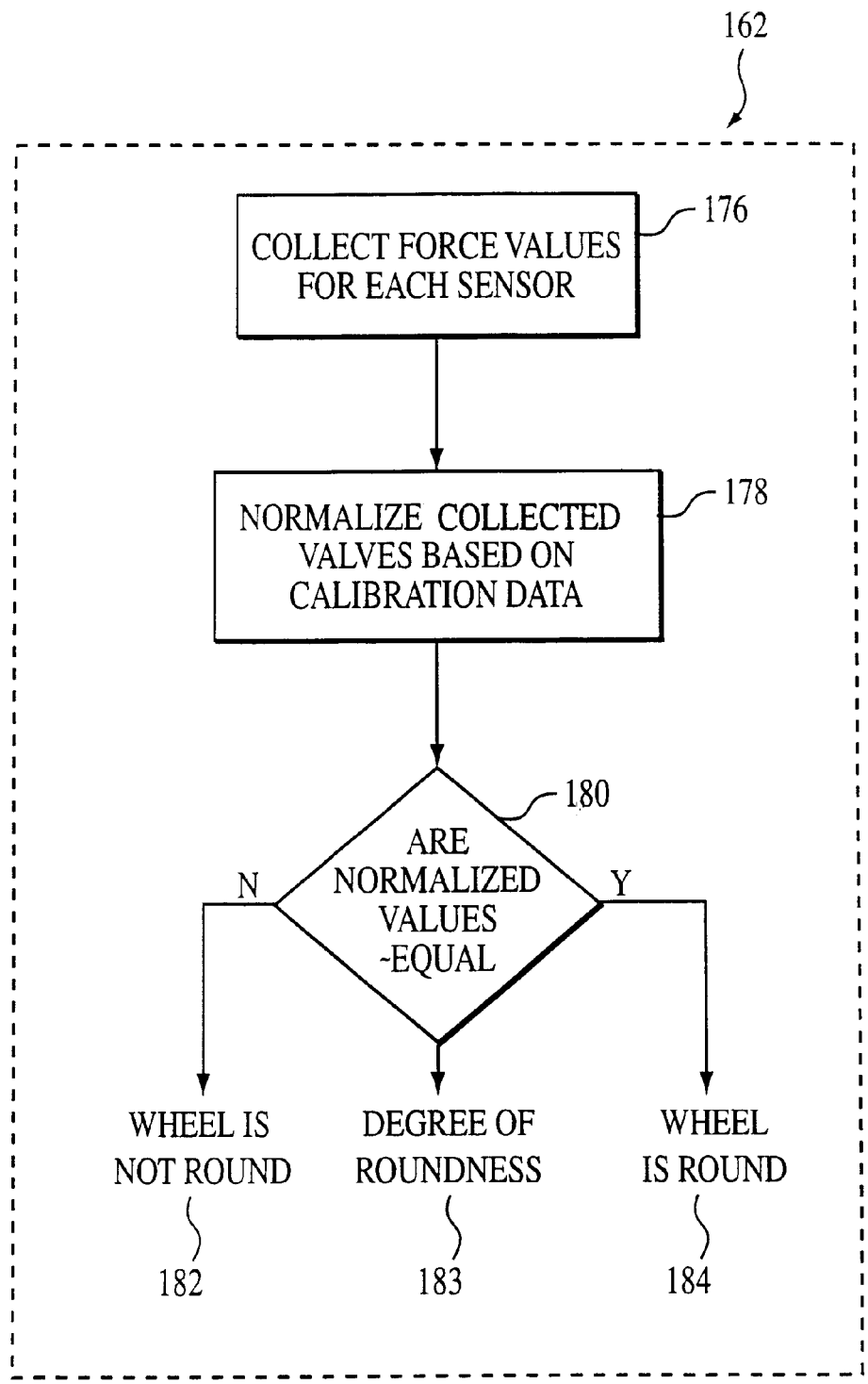
FIG. 17 is a flowchart of a process for determining wheel roundness.

Many wheel characteristics can be determined by comparing the output of different sensors collected at substantially the same time. For example, referring to FIG. 17, instructions 162 may determine wheel roundness by collecting nearly contemporaneous force measurements from different force sensors (step 176). If not performed by the DSP 64 prior to transmission, the instructions 162 may normalize the collected measurements based on sensor calibration data (step 178). In a round wheel, each sensor should report nearly equal normalized force measurements. The instructions 162 compare the different normalized measurements using a configurable threshold (step 180). Based on the comparison, the instructions 162 can determine whether the wheel is round (step 184) or misshapened (i.e., "out-of-round") (step 182). The instructions 162 can also produce a value indicating a degree of roundness (step 183) instead of simply producing a binary round/not-round determination.

Figure 18:
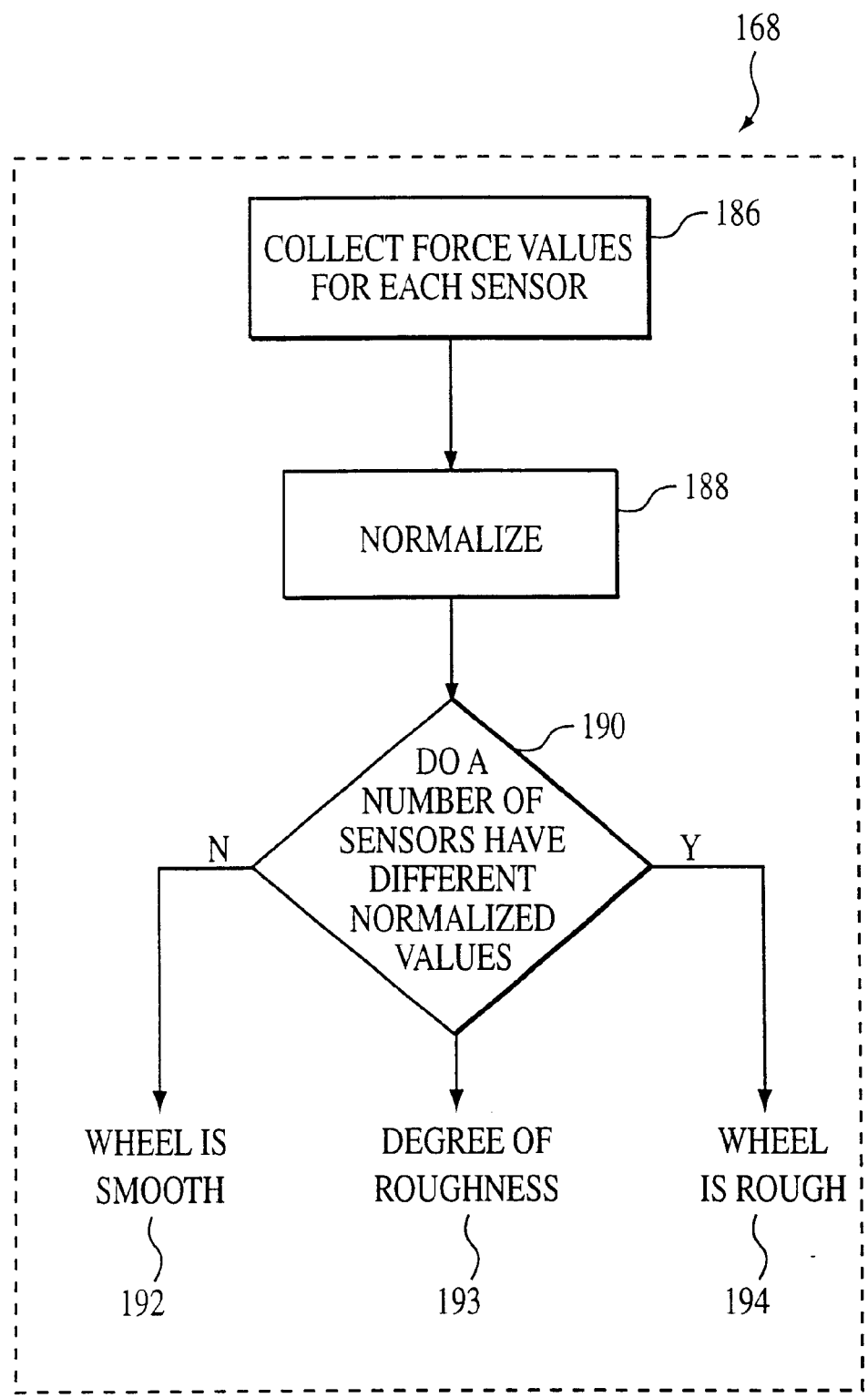
FIG. 18 is a flowchart of a process for determining wheel surface roughness.

Referring to FIG. 18, instructions 168 can use a similar technique to determine wheel surface roughness. When a wheel becomes rough, different force sensors produce different normalized force values. Again, by comparing substantially contemporaneously collected force values for different sensors (step 186), normalizing these values (step 188), and comparing the normalized values (step 190), the instructions 168 can determine whether a wheel is smooth (step 192) or exhibits varying degrees of roughness (steps 193, 194).

Figure 19:
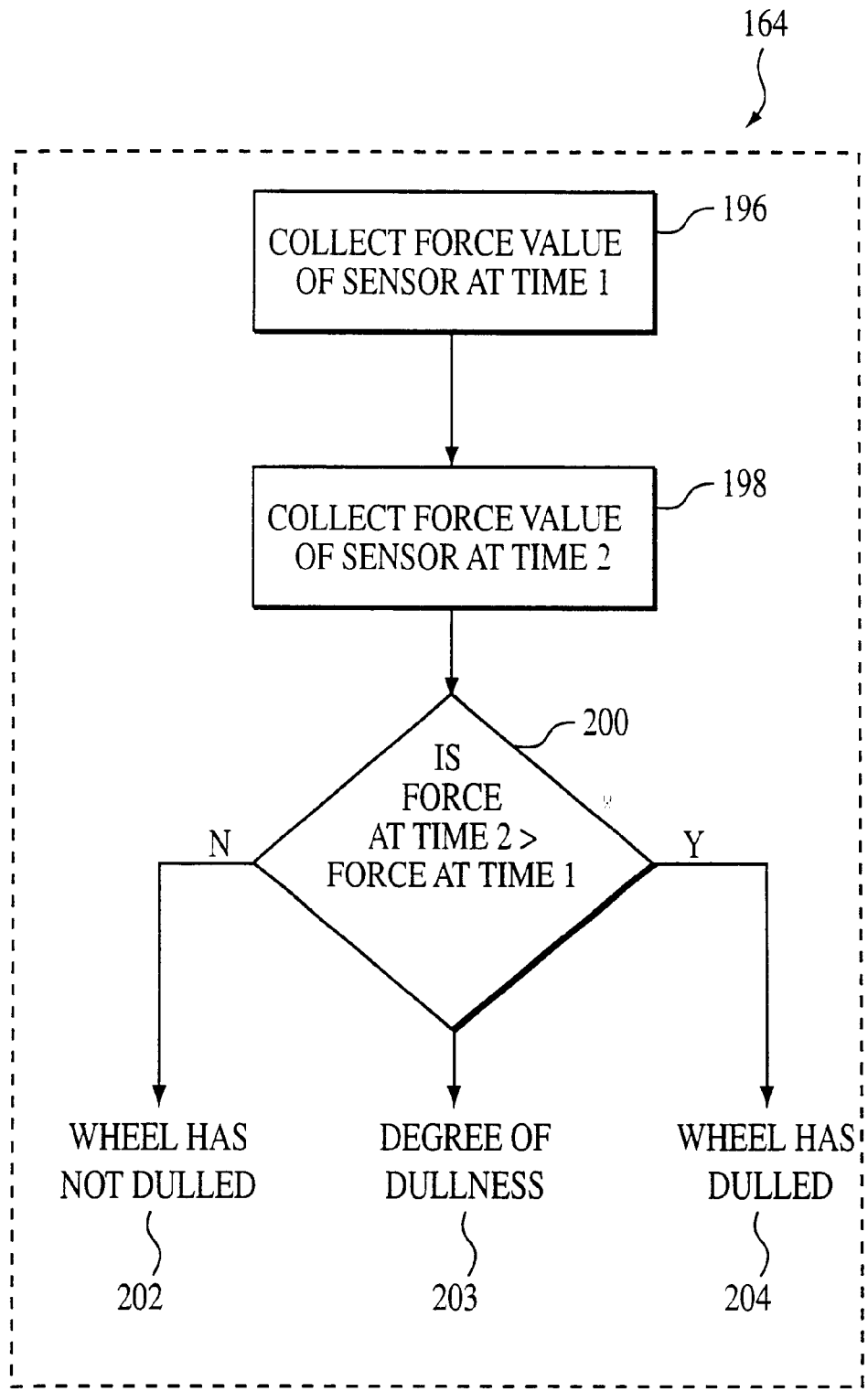
FIG. 19 is a flowchart of a process for determining wheel dullness.

Referring to FIG. 19, a variety of wheel characteristics can also be determined by comparing the measurements of a sensor or sensors at different times. For example, as shown in FIG. 19, instructions 164 determine whether a wheel has dulled by comparing (step 200) a sensor's force measurement at a first time (step 196) with a force measurement of the same sensor at a second time (step 198). As a wheel dulls, the forces exerted on each sensor tend to increase due to greater friction. Thus, if, over time, a sensor reports an increase in force, the instructions 164 may determine the wheel is becoming increasingly dull (steps 203, 204).

Figure 20:
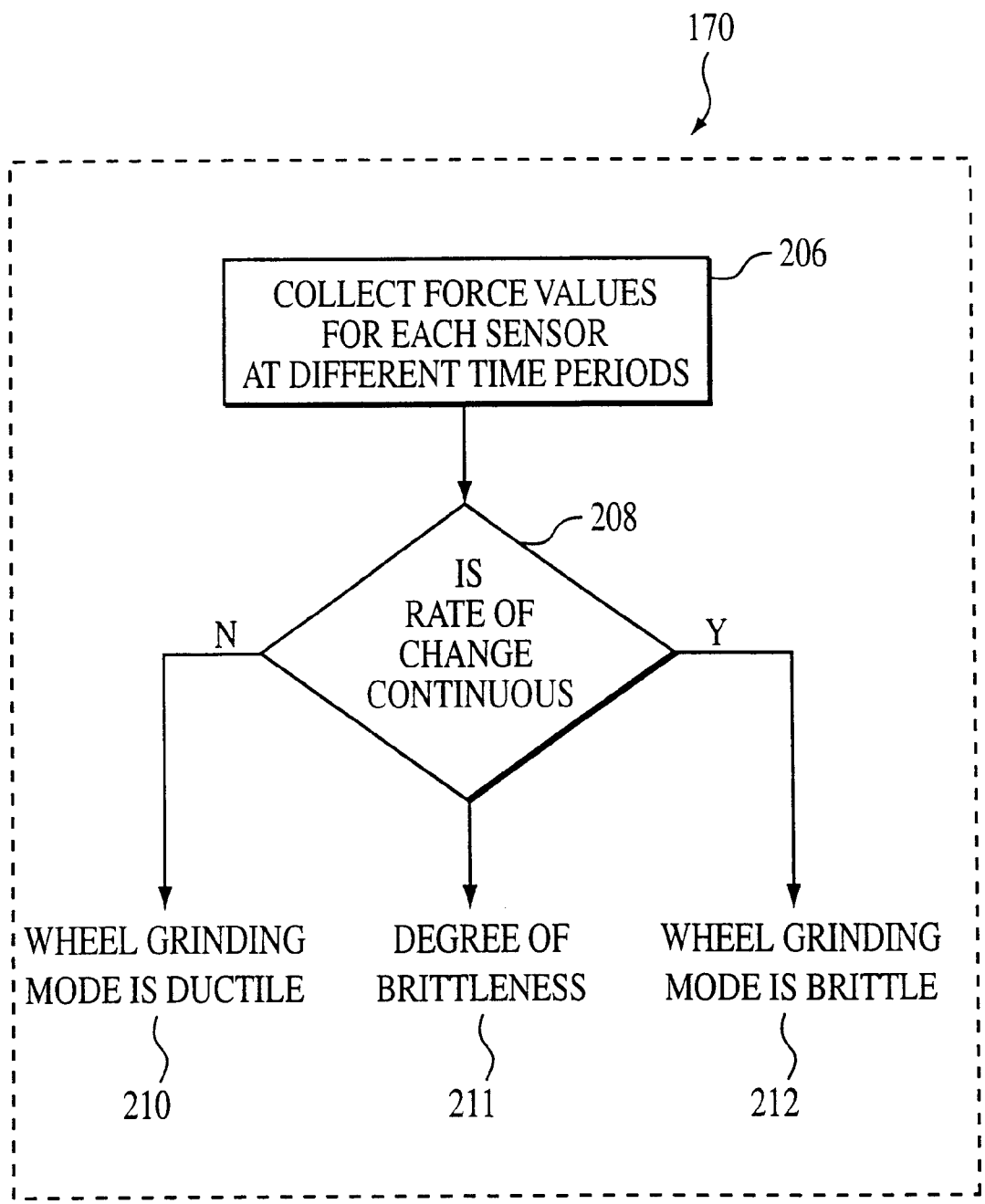
FIG. 20 is a flowchart of a process for determining a wheel grinding mode.

One characteristic of a wheel is its grinding mode. For example, a wheel may be grinding a workpiece 14 in a continuous manner (e.g., ductile grinding) and/or by displacing discrete chunks at non-periodic intervals (e.g., brittle grinding). As shown in FIG. 20, by collecting force values produced by different sensors at different time periods (step 206) and determining the rate of change in these values (step 208), the instructions 170 can determine whether a wheel is grinding workpiece 14 in a ductile (step 210) or brittle (step 212) manner or some combination thereof (step 211).

Figure 21:
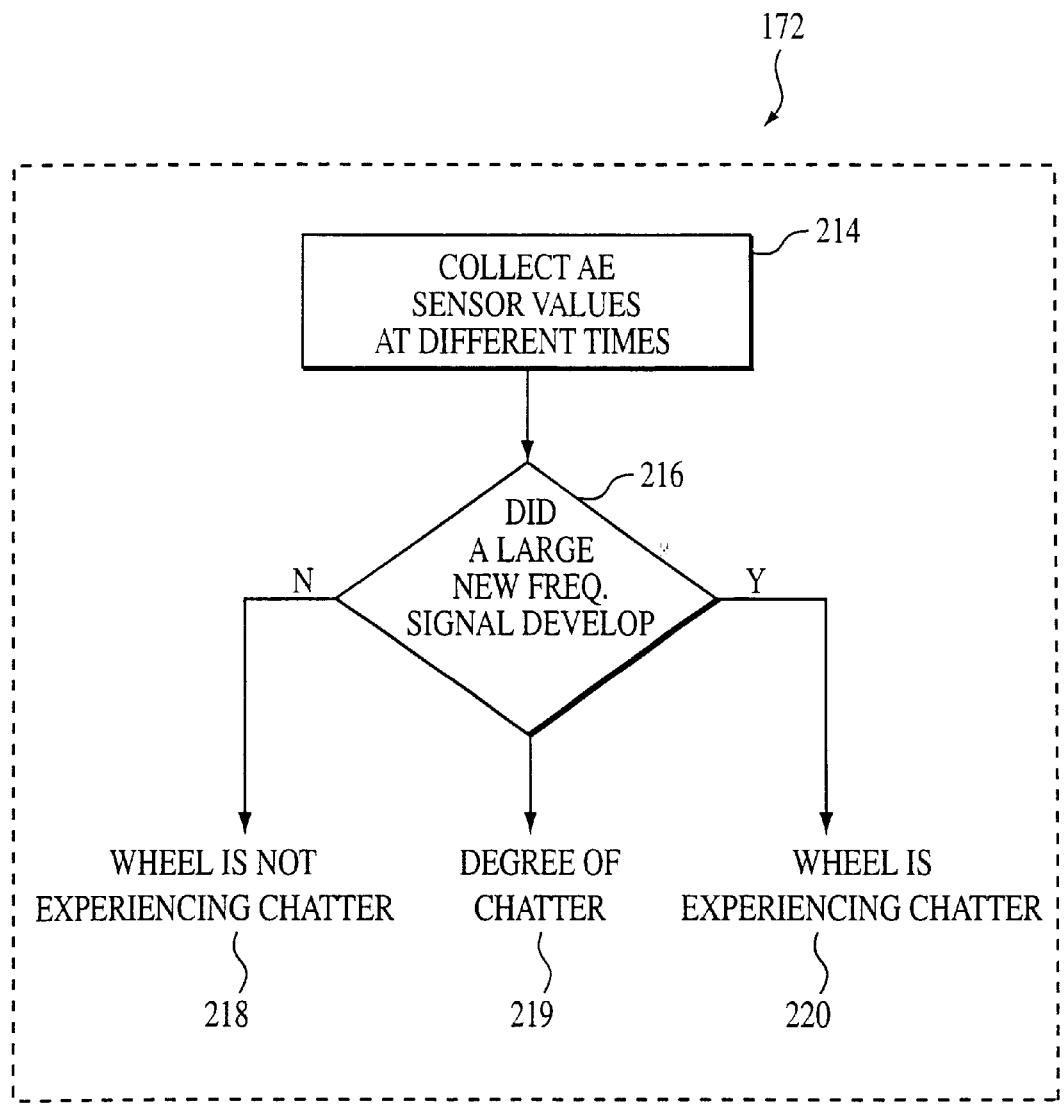
FIG. 21 is a flowchart of a process for determining wheel chatter.

Referring to FIG. 21, instructions 172 may also determine the degree of chatter a wheel experiences by comparing sensor responses collected at different time periods. In one technique, the responses of an AE sensor (or sensors) are collected at different time periods (step 214) and the signals are analyzed in the frequency domain (step 216). In the frequency domain, chatter appears as a strong frequency outside the bandwidth typically produced by a non-chattering wheel. By comparing the AE signals from different time periods in the frequency domain (step 216), frequencies corresponding to chattering can be detected (steps 219, 220).

Figure 22:
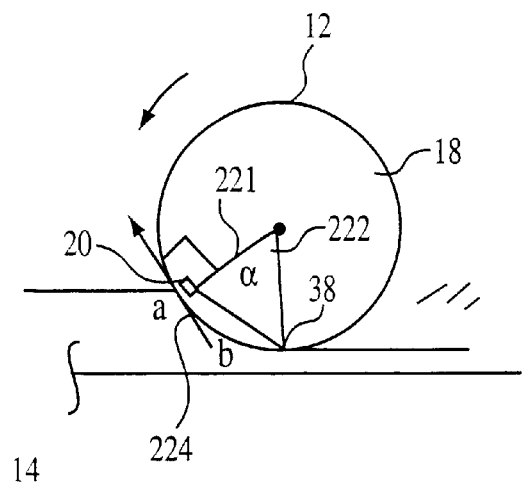
FIG. 22 is a diagram illustrating tangential forces that act on a wheel.

Referring to FIG. 22, grinding produces a tangential force upon a wheel's surface 12. As shown, a sensor 20 at point a on the wheel surface 12 experiences a tangential force 224. An angle, $\alpha$, is formed from a normal 221 formed by the curvature of the wheel at point a and a normal 222 formed by the curvature of the wheel at point b (38). The tangential force at point a equals (sine($\alpha$)×the force reported by sensor 20 at point b).

Figure 23:
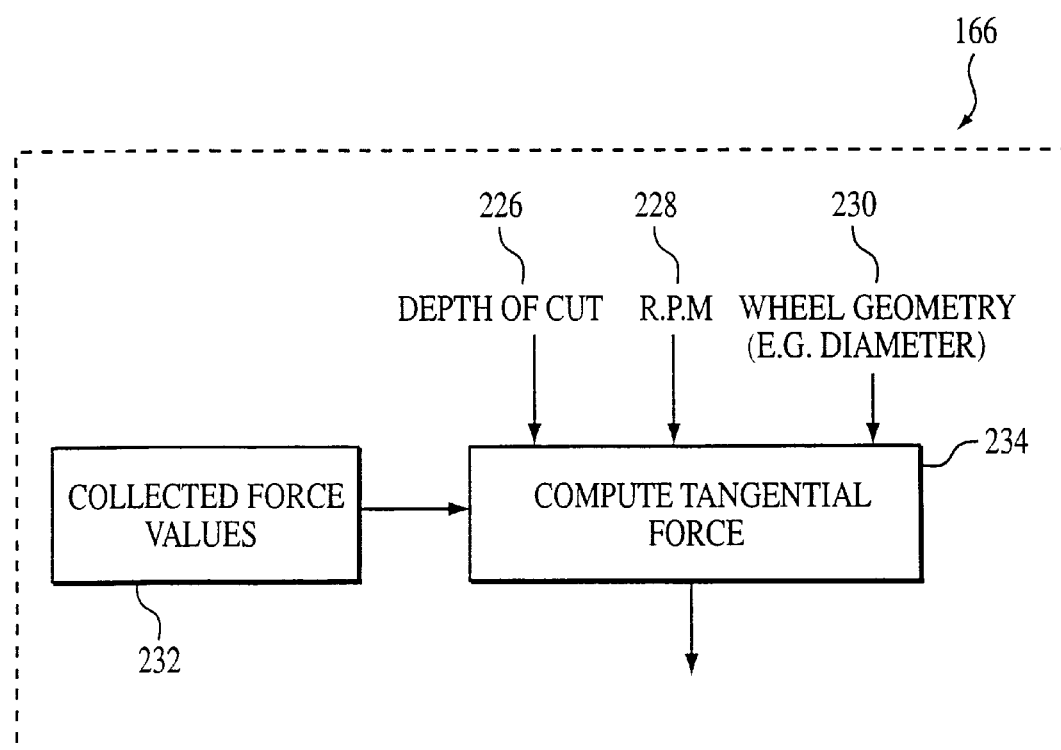
FIG. 23 is a flowchart of a process for determining tangential wheel forces.

Referring to FIG. 23, the relationship described above is only one method of determining the tangential force. Instructions 166 can use one of these methods to compute the tangential force experienced by a portion of the wheel surface 12. The instructions 166 may use depth of cut 226, RPM 228, and wheel geometry 230 (e.g., diameter) information to compute the tangential force (step 234) based on collected force sensor values (step 232).

Figure 24:
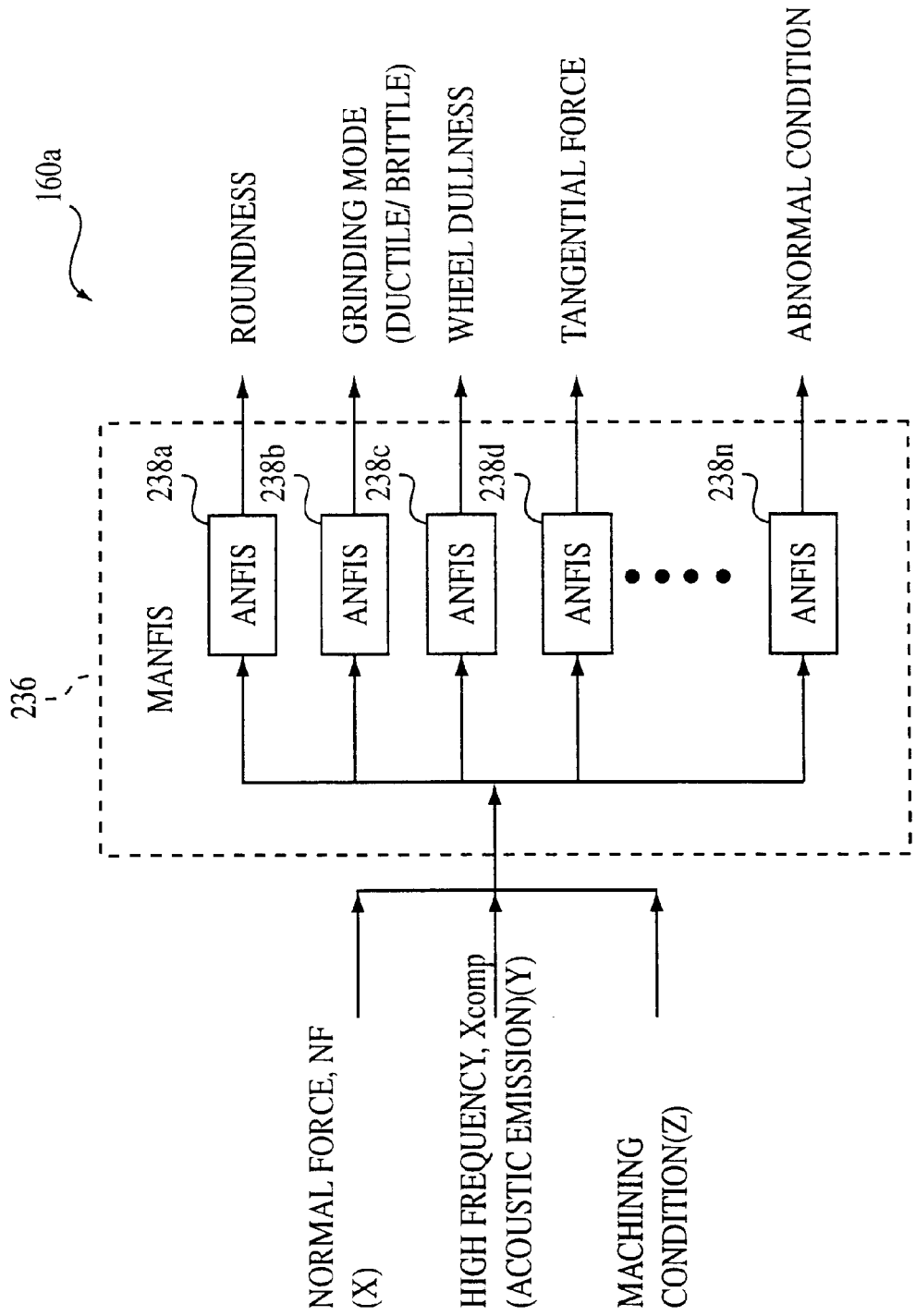
FIG. 24 is a diagram of an multiple adaptive neuro-fuzzy inference system (MANFIS).

Referring to FIG. 24, a Multiple Adaptive Neuro-Fuzzy Inference System (MANFIS) 160a can be employed to efficiently analyze sensor data. A MANFIS 160a is a collection of several Adaptive Neuro-Fuzzy Inference System (ANFISs) software networks 238a–238n, each of which is trained to recognize a particular feature (e.g., roundness, grinding mode, estimated tangential force, surface roughness, and grinding temperature). Typically, each ANFIS 238a–238n will have three inputs, which include the normal force X, acoustic emission information Y, and the grinding conditions Z (e.g., previously determined information).

Figure 25:
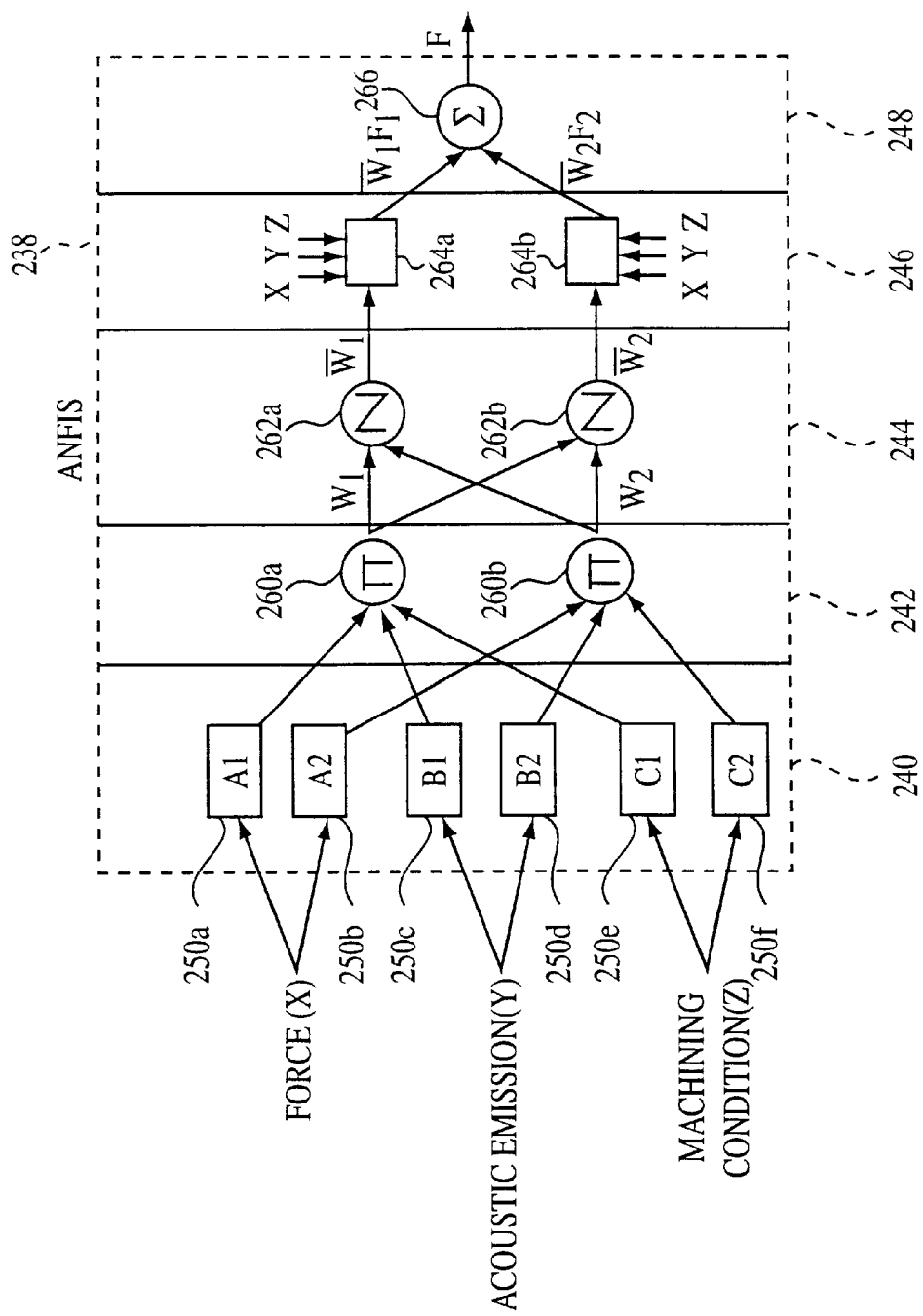
FIG. 25 is a diagram of an adaptive neuro-fuzzy inference system (ANFIS).

Referring to FIG. 25, an ANFIS 238 includes a network of different communicating software layers 240–248. In a first layer 240, each input is spanned by a set of membership functions 250a–250f. A set of weights in layers 242 and 244 and node functions in layer 246 link the membership functions 250a–250f to an output layer 248. A particularly suitable membership function for the ANFIS architecture is the generalized bell membership function described by three parameters:

$$\mu Ai = \frac{1}{1+\left|\frac{x-c}{a}\right|^{2b}} \quad [4]$$

where $\mu Ai$ is the membership function value computed for an input value x, for particular values of parameters a, b and c (called premise parameters). The input (e.g., force x) is spanned by a set of these membership functions. For example, as shown, a set of two membership functions 250a–250b span the force input. Thus, layer 240 has two outputs for force which are fed further into the network. Similar layer 240 outputs are obtained for other inputs.

Layer 242 sums the outputs from layer 240 and multiplies the sums by weights $w_i$. Layer 244 sums the outputs of layer 242 and multiplies these outputs by normalized weights $w_i$ such that:

$$\overline{W_i} = \frac{W_i}{\Sigma W_i} \quad [5]$$

In layer 246 outputs from layer 244 are combined using linear models 264a–264b. The output for each node 264a–264b in layer 246 can be described as:

$$f_i = p_i X + q_i Y + r_i Z + s_i \quad [6]$$

where $f_i$ is the node output for particular values of parameters $p_i$, $q_i$, $r_i$ and $s_i$. These parameters are called consequent parameters and are determined by training as described below. Finally, ANFIS 238 output is obtained as a combination of each output as:

$$f = w_1 f_1 + w_2 f_2 + w_3 f_3 \quad [7]$$

Thus, if normal force vector (X), high frequency content (Y) and machining condition (Z) are given, the above network can produce an output for specified values of weights, premise and consequent parameters.

The procedure of finding the optimized parameters and weights is called ANFIS 238 training. This training involves determining a number of membership functions, values for weights, premise and consequent parameters such that the network can predict the outputs accurately. In other words, training enables the ANFIS 238 to recognize certain patterns in the input signal and accordingly predicts the most appropriate output.

Training can be performed by presenting the network 238 with a set of inputs having known outputs. The parameters and weights can then be adjusted so that output predicted by the ANFIS 238 matches the known output values. The set of known input-output values used to train the ANFIS 238 is called the training data set. The training data set can be formed from data collected by the grinding wheel system 16 in parallel with a calibrated, wired data acquisition system on the grinding machine. The data collected by the grinding wheel system 16 forms the input set for training, while the data collected from the calibrated, wired system forms the known output. The calibrated, wired system includes a force dynamometer to determine normal and tangential forces, a power transducer and thermocouples, together with measurements of geometric wheel form (wheel roundness, waviness etc.), and wheel surface topology. The training data can be used to train each individual ANFIS 238 of the inference system 236. The optimized values of both the premise and consequent parameters obtained after training the MANFIS 236 in this manner is used for real-time monitoring of wheel preparation and the grinding process.

The instructions 160 may be used to implement a MANFIS 236 which collects different inference systems 238a–238n trained to recognize different wheel characteristics. The system 236 combines the power of neural networks capable of recognizing patterns with fuzzy logic which facilitates easy description of inputs and outputs. The system 236 can be trained both on-line and off-line. On-line training enables the system to recognize a new grinding phenomenon in any "new" environment (e.g, a new workpiece material, a new grinding wheel core, or a new grinding wheel abrasive). Further, the individual inference systems 238a–238n may share information with each other making them co-active adaptive inference systems.

Referring to FIGS. 26A–26C, a graphical user interface 150a–150c provides operators with graphic representations of grinding wheel characteristics. The interface 150a–150c screens shown are merely exemplary. As shown in FIG. 23A, the interface 150a may display wheel specifications 284 (e.g., the type of abrasive material, wheel diameter, and width) and grinding conditions 282 (e.g., the workpiece material). The interface 150a may also display other wheel characteristics such as wheel speed 270, dullness 272, roundness 274, and the grinding mode 278. The interface 150a also permits an operator to specify a file 280 to store data collected during a grinding session for further analysis.

Referring to FIG. 26B, the interface 150b may also display the force 288 or acoustic emission 286 measurements made by different wheel sensors. Referring to FIG. 26C, the interface 150c may also indicate wheel characteristics such as tangential force 294, temperature 296, spindle power 292, and surface roughness 290.

Implementation

The invention can be implemented in hardware or software, or a combination of both. The programs should be designed to execute on programmable computers each comprising a processor, a data storage system (including memory and/or storage elements), at least one input device, and at least one output device, such as a CRT or printer. Program code is applied to input data to perform the functions described herein and generate output information. The output information is applied to one or more output devices such as a CRT, as described herein.

Each program is preferably implemented in a high level procedural or object oriented programming language to communicate with a computer system. However, the programs can be implemented in assembly or machine language, if desired. In any case, the language can be a compiled or interpreted language.

Each such computer program is preferably stored on a storage medium or device (e.g., ROM or magnetic diskette) readable by a general or special purpose programmable computer, for configuring and operating the computer when the storage media or device is read by the computer to perform the procedures described herein. The system can also be considered to be implemented as a computer-readable storage medium, configured with a computer program, where the storage medium so configured causes a computer to operate in a specific and predefined manner to perform the functions described herein.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A grinding wheel system, comprising:
   a grinding wheel including at least one embedded sensor, each sensor having a lead;
   an adapter disk containing electronics that process signals produced by each embedded sensor, the adapter disk constructed to attach to the grinding wheel and connect to each sensor lead, the electronics including a transmitter that transmits sensor information; and
   a data processing platform comprising:
      a processor;
      a receiver that receives sensor information transmitted by the adapter disk electronics; and
      instructions that cause the processor to process the received sensor information.

2. The system of claim 1, wherein the grinding wheel includes at least one force sensor.

3. The system of claim 2, wherein at least one force sensor is positioned near the grinding wheel periphery.

4. The system of claim 1, wherein the grinding system includes at least one acoustic emission sensor.

5. The system of claim 4, wherein at least one acoustic emission is positioned near the grinding wheel rim.

6. The system of claim 1, wherein at least one sensor is a piezoceramic sensor.

7. The system of claim 1, wherein the electronics comprise:
   an analog to digital converter connected to a sensor; and
   a digital signal processor fed by the analog to digital converter.

8. The system of claim 1, wherein the electronics comprise a multiplexer connected to the embedded sensors.

9. The system of claim 1, wherein the instructions cause the processor to compare sensor information collected from different sensors at substantially the same time.

10. The system of claim 1, wherein the instructions cause the processor to compare sensor information collected from a sensor at different times.

11. The system of claim 1, wherein the instructions cause the processor to process sensor information using at least one neuro-fuzzy network.

12. A grinding wheel system, comprising:
   a grinding wheel including at least one piezoceramic sensor embedded near the wheel periphery that detects wheel forces and at least three piezoceramic sensors positioned near the grinding wheel rim that detect acoustic emissions, each sensor having a lead;
   an adapter disk containing electronics that process signals produced by the sensors, the adapter disk constructed to attach to the grinding wheel and connect to each sensor lead, the electronics comprising:
      a multiplexer fed by the sensor leads;
      an analog to digital converter fed by the multiplexer;
      a digital signal processor fed by the analog to digital converter; and
      a radio frequency transmitter fed by the digital signal processor that transmits sensor information; and a data processing platform comprising:
   a processor;
   a radio frequency receiver that receives sensor information transmitted by the adapter disk electronics; and
   instructions that cause the processor to process the received sensor information.

13. An adapter assembly that processes signals produced by at least one sensor embedded in a grinding wheel, the adapter assembly comprising
   an adapter disk configured for attachment to the grinding wheel;
   at least one lead that connects the adapter assembly to the sensor embedded in the grinding wheel; and
   electronics within the adapter disk that process sensor signals.

14. The apparatus of claim 13, wherein the electronics comprise a wireless transmitter.

15. The apparatus of claim 13, wherein the electronics comprise:
   a multiplexer fed by each sensor lead;
   an analog to digital converter connected to the multiplexer; and
   a digital signal processor connected to the analog to digital converter.

16. The adapter assembly of claim 13, wherein the electronics comprise:
   an analog to digital converter connected to a sensor; and
   a digital signal processor fed by the analog to digital converter.

17. The adapter assembly of claim 13, further comprising a dummy disk having the same mass distribution as the adapter disk.

18. The adapter assembly of claim 13, wherein the electronics within the adapter disk comprise a multilayer design.

* * * * *